US008913053B2

(12) United States Patent
Ooga

(10) Patent No.: US 8,913,053 B2
(45) Date of Patent: Dec. 16, 2014

(54) IMAGE DISPLAY DEVICE AND VIDEO SIGNAL PROCESSING METHOD USED IN SAME

(75) Inventor: Kouichi Ooga, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 275 days.

(21) Appl. No.: 12/862,188

(22) Filed: Aug. 24, 2010

(65) Prior Publication Data

US 2011/0043512 A1 Feb. 24, 2011

(30) Foreign Application Priority Data

Aug. 24, 2009 (JP) ................................ 2009-193603

(51) Int. Cl.
*G06F 3/038* (2013.01)
*G09G 5/00* (2006.01)
*G09G 3/36* (2006.01)

(52) U.S. Cl.
CPC ...... *G09G 3/3688* (2013.01); *G09G 2320/0209* (2013.01)
USPC ........................................................ 345/212

(58) Field of Classification Search
USPC .................................................. 345/89, 204
See application file for complete search history.

(56) References Cited

U.S. PATENT DOCUMENTS

2005/0168424 A1* 8/2005 Nakamoto et al. .............. 345/89
2006/0262049 A1* 11/2006 Kim ............................... 345/76
2010/0207930 A1* 8/2010 Chung et al. ................. 345/214
2010/0225620 A1* 9/2010 Lee .............................. 345/204

FOREIGN PATENT DOCUMENTS

CN 1432990 A 7/2003
JP 11-174406 A 7/1999
JP 2003-208134 A 7/2003
TW 200737067 10/2007

OTHER PUBLICATIONS

Office Action issued by Chinese Patent Office in Chinese Application No. 201010266976.5 dated Oct. 9, 2013.

* cited by examiner

*Primary Examiner* — Kent Chang
*Assistant Examiner* — Nathan Brittingham
(74) *Attorney, Agent, or Firm* — Sughrue Mion, PLLC

(57) ABSTRACT

The degree of an influence from wiring crosstalk between signal lines of a data signal transmission line (video signal line) is decided on the basis of an input signal generated in display controlling unit (a timing controller) at a predetermined timing (at each frame period, at each clock pulse period, or at each horizontal period) and, based on a result of the decision, the voltage amplitude of a data signal is adjusted so that it may exceed an input amplitude specification value for data line driving circuits (data drivers) by a predetermined value.

11 Claims, 12 Drawing Sheets

IMAGE DISPLAY DEVICE AND VIDEO SIGNAL PROCESSING METHOD USED IN SAME

INCORPORATION BY REFERENCE

This application is based upon and claims the benefit of priorities from Japanese Patent Application No. 2009-193603, filed on Aug. 24, 2009, the disclosures of which are incorporated herein in its entirely by reference.

BACKGROUND OF THE INVENTION

1. Field of the Invention

The present invention relates to an image display device and a video signal processing method used in same and, more specifically to, an image display device and a video signal processing method used in the same that are well suited for applications in a case where a video signal is transmitted through a video signal line to a data driver by utilizing a differential transmission system, for example, in the case of a liquid crystal display (LCD) and a plasma display device.

2. Description of the Related Art

The thin image display devices such as an LCD and a plasma display device have come to have a longer transmission distance of video signals therein owing to an increasing screen size in the recent years and also to have a larger amount of data transmitted by the video signal owing to an increasing resolution of a display panel, so that the image display devices are required to have more wirings and higher transmission rates. In such a case, the image display devices suffer from deterioration in electro-magnetic interference (EMI) properties and severer conditions for accurate transmission of the video signal and, on the other hand, need to save on power and space, specifically, on power consumed in internal circuitry and realize miniaturization and higher-density packaging of the circuit components. It has caused the recent image display devices to mainly employ a video signal transmission method referred to as the differential transmission system, by which the number of the required video signal lines will be reduced.

Further, this type of the image display device may receive a variety of video signals incoming thereto; therefore, on its substrate for transmitting the video signals directed to a display panel, if the video signals transmitted through mutually neighboring wirings and so susceptible to wiring crosstalk, such as those with mutually reversedpolarities (for example, polarities “1” and “0”), are received, effective voltage amplitudes of the video signals are reduced, and if the effective voltage amplitudes become less than an input amplitude specification to be used as a minimal reference amplitude below which a data driver cannot operate properly, display noise such as flicker occurs on a screen. To avoid such a situation, if a voltage amplitude output from a timing controller is set large beforehand so that the effective voltage amplitudes may be sufficiently large as compared to the input amplitude specification value for the data driver, dissipation power increases along with another bad effect of tradeoff in deterioration of the EMI properties. On the other hand, if inter-wiring spacing or a ground wiring is to be provided which is long enough to avoid the signals from interfering with each other even when exposed to wiring crosstalk, the substrate needs to be larger in area, leading to a bad effect of not only preventing miniaturization of the device as a whole but also increasing the costs.

As this kind of related art, there is provided an image display device shown in FIG. 7.

As shown in FIG. 7, the image display device includes a display panel 1, a scan driver 2, a data driver 3, a timing controller 4, and a video signal line 5. The timing controller 4 is fitted with a data signal output section **4*a*. The display panel 1 includes a liquid crystal display (LCD) and has scanning lines along predetermined rows as well as data lines 1*b* along predetermined columns and pixels (not shown) each of which is positioned at an intersection of each of the scanning lines is and each of the data lines 1*b*. The data driver 3 drives the data lines 1*b* on the display panel 1. Based on a control signal ct1 received from the timing controller 4, the data driver 3 writes pixel data based on a supplied data signal vj to each of the data lines 1*b***.

Based on a control signal ct2 received from the timing controller 4, the scan driver 2 outputs a scanning line drive signal intended to drive the scanning lines **1*a* on the display panel in predetermined order (for example, in a line sequence). The timing controller 4 generates an input signal receivable by the data driver 3 based on an externally input video signal vi, provides the data driver 3 with the control signal ct1, sets a voltage amplitude of the input signal, and sends the signal as the data signal vj from the data signal output section 4*a* through a video signal line 5, while providing the scan driver 2 with the control signal ct2. The video signal line (data signal transmission line) 5** is used to send the data signal vj by utilizing a differential transmission system and has such a number of signal lines as to be needed when a binary representation of the maximum value of a gradation level of at least the video signal vi is applied to a reduced swing differential signaling (RSDS: one digital interface technology for use in LCD panels) transmission format, so that each of the mutually neighboring pairs of those signal lines may send the differential transmission system-complying data signals vj having the mutually reverse phases, as one pair of signal lines.

FIG. 8 is an explanatory diagram of a transmission format for an RSDS signal.

As shown in FIG. 8, the transmission format of, for example, an eight-bit RSDS signal is made of four pairs of transmission signals in which a total of eight transmission signals are arranged because each of the four pairs include two differential signals of positive-polarity and negative-polarity ones, so that data may be latched at the trailing edge and the leading edge of a transmission clock signal CLK. If the transmission data signal vj is of, for example, 198 gradations, the 198-th gradation level is represented as “11000110” in binary number and has an actual waveform of “HHLLLHHL” in a bit string. If applied to the RSDS transmission format, the bit string may be given as shown in FIG. 8. It is to be noted a transmission signal D (0) indicates a least significant bit (LSB) and a transmission signal ID (7) indicates a most significant bit (MSB). If the video signal vi in FIG. 7 described above is, for example of eight bits, the maximum is the 255-th gradation level and represented as “11111111” in binary number, so that if applied to the RSDS transmission format, the maximum level requires four pairs of video signals because data is latched at the two edges of each pulse of the clock signal; further because the video signals are of the differential transmission system, a total of eight video signal lines 5 (=four positive-polarity signal lines 5 and four negative-polarity signal lines 5) will be required. It is to be noted that even in the case of any other differential transmission systems such as mini-LVDS, similarly, the number of the signal lines required is determined by applying the bit string to the transmission format.

In the image display device in FIG. 7, the video signal vi is input to the timing controller 4, where the vide signal vi is rearranged into a signal receivable by the data driver 3; then the data signal output section 4*a* in the timing controller 4 sets an amplitude of a transmission voltage of the signal and outputs it as the data signal vj, being accompanied by the generation of the corresponding generation timing signal, the horizontal reference signal (control signal ct1) directed to the data driver 3, and the vertical reference signal (control signal ct2) directed to the scan driver 2. The data signal vj whose transmission voltage amplitude is set in such a manner is sent to the data driver 3 via the video signal lines 5 that comply with the differential transmission system. Then, an image that corresponds to the video signal vj will be displayed on the panel 1.

It is to be noted that the video signal vi is rearranged by the timing controller 4 into a data signal vj intended to drive the data driver 3, in which case the data signal vj is transmitted through the video signal line 5 in accordance with a predetermined transmission format. The transmission format corresponds to, for example, an eight-bit RSDS signal. The data signal vj corresponding to the RSDS signal is a digital signal (whose high and low levels are indicated by "H" and "L" respectively, which are in turn indicated by "1" and "0" respectively) at the same time as being a differential signal. Two of the video signal lines 5 through which the differential data signals vj are transmitted are paired: one for the positive-polarity video signal and the other for the negative-polarity one. Those video signals come in the "H" signal if their respective polarities' potentials are higher than the reference voltage (potential) of the data signal vj and "L" signal if those potentials are lower than reference voltage (potential). Further, if a remainder is positive which is obtained by subtracting a potential of the negative polarity video signal from a potential of the positive-polarity video signal, those signals come in an "H" level differential signal; on the other hand, if the remainder is negative which is obtained by subtracting the potential of the negative polarity video signal from the potential of the positive-polarity video signal, those signals come in an "L" level differential signal. Additionally, in the differential transmission system, the clock signal for transmission of the data signal vj is also a differential signal.

FIG. 9 is a chart for showing an example of waveforms of the data signal vj transmitted through the video signal lines 5.

The RSDS signals are a differential signal and, as shown in FIG. 9, their polarity is determined to be "H" or "L" by a pair of a video signal DATA (+) along the positive-polarity video signal line and a video signal DATA (−) along the negative-polarity video signal line. For example, if the video signal has a reference potential of 1.1V and the video signals DATA (+) and DATA (−) have potentials of 1.2V and 1.0V respectively, the differential signal has a value of +200 mV and so comes in the "H" level. On the other hand, if the video signal has a reference potential of 1.1V and the video signals DATA (+) and DATA (−) have potentials of 1.0V and 1.2V respectively, the differential signal has a value of −200 mV and so comes in the "L" level. To recognize the "H" level in the data driver 3, the value of +200 mV of the differential signal needs to be higher than the "H" level threshold in the data driver 3; similarly, to recognize the "L" level, the value of −200 mV needs to be lower than the "L" level threshold in the data driver 3.

If the input video signal vi is of, for example, 179 gradations, the digital signal has a bit string of "HLHHLLHH" ("10110011"), which is arranged in accordance with the RSDS signal transmission format as shown in Gradation pattern [1] in FIG. 9. Further, if the input video signal vi is of, for example, 140 gradations, the digital signal has a bit string of "HLLLHHLL" ("10001100"), which is arranged in accordance with the RSDS transmission format as shown in Gradation pattern [2] in FIG. 9.

FIGS. 10 and 11 are a chart for showing an influence from wiring crosstalk received from the data signal vj transmitted through the neighboring video signal lines.

FIGS. 10 and 11 show how the amplitude of a voltage transmitted through one of the video signal lines is affected by a digital signal transmitted through its neighboring video signal line. The digital signal has shown pattern of "H" and "L". That is, FIG. 10 shows the influence on the DATA (+) signal of interest in the first pair extracted along with the second pair from the chart of the waveforms of the data signal vj in FIG. 9. On the other hand, FIG. 11 shows an example where the data signal vj has a different gradation pattern from that in FIG. 10. It is to be noted that in the Neighbor pattern [1] in FIG. 10, the video signal DATA (+) in the first pair of the video signal lines of interest is neighbored by the video signal DATA (−) which is in the second pair and has the "H" polarity, the same as that of the video signal DATA (+) having the "H" polarity. Further, similarly, in the Neighbor pattern [2], the video signal DATA (+) along the video signal line of interest has the "L" polarity, which is the same polarity as that of the signal DATA (+) in the second pair having the "L" polarity.

On the other hand, in the Neighbor pattern [3] in FIG. 11, the video signal DATA (+) along the video signal line of interest has the "H" polarity, whereas the video signal DATA (−) in the neighboring second pair has the "L" polarity, which is the reverse polarity. Similarly, in the Neighbor pattern [4] also, the video signal DATA (+) along the video signal line of interest has the "L" polarity, whereas the video signal DATA (−) in the neighboring second pair has the "H" polarity, which is the reverse polarity. In such a manner, in the case of differential signals, the video signals transmitted through the mutually neighboring two video signal lines have the four polarity patterns. That is, there are those four neighbor patterns because the differential video signals DATA (+) and DATA (−) in each of the pairs have the mutually reverse polarities always.

When the signals having those four neighbor patterns respectively are being transmitted through the video signal lines 5, a transmission voltage amplitude of the video signal DATA (+) transmitted through the video signal line of interest changes as it is affected by its neighbor patterns.

Hereinafter, in explanation, the amplitude of a voltage of the video signal as output from the timing controller 4 is referred to as "output voltage amplitude" and that of the video signal actually being transmitted through the video signal line 5 is referred to as "effective voltage amplitude".

In the Neighbor patterns [1] and [2] in FIG. 10, the video signal along the video signal line of interest has the same polarity as the video signal along the video signal line in the neighboring pair, so that those two video signals have little difference in potential; therefore, the effective voltage amplitude of the video signal along the video signal line of interest is not affected by the video signal line in the neighboring pair. Accordingly, its output voltage amplitude and effective voltage amplitude are almost the same as each other.

On the other hand, in the Neighbor patterns [3] and [4] in FIG. 11, the video signals along the paired video signal lines that neighbor the video signal line of interest have the mutually reverse polarities and so have a difference in potential therebetween, which difference interferes with the video signal along the video signal line of interest, that is, the signal DATA (+) in the first pair and the signal DATA (−) in the second pair, so that their effective voltage amplitudes become smaller than the output voltage amplitude. In such a manner, the effective voltage amplitude of the video signal transmitted through a given video signal line may become smaller than the output voltage amplitude owing to influence of the video signal transmitted through the neighboring video signal line, which phenomenon may be the wiring crosstalk.

The image display device shown in FIG. 7 has a problem in that display noise such as flicker occurs on a screen, because a transmission error occurs if the effective voltage amplitude of the data signal vj transmitted via the video signal line 5 becomes smaller than the input amplitude specification value for the data driver 4 owing to an influence from wiring crosstalk. For example, in the Neighbor patterns [3] and [4] in FIG. 11, due to the influence from wiring crosstalk, the effective voltage amplitude becomes smaller than the output voltage amplitude, so that there is a possibility that display noise may occur. The degree of the influence from the wiring crosstalk depends on the gradation in the incoming video signal vi; for example, the wiring crosstalk from the neighboring pair has no influence if the video signal vi is input which is of such a gradation that the video signal along the video signal line of interest may have the same polarity as that of the video signal along the video signal line in the neighboring pair as shown in FIG. 10.

In such an image display device that countermeasures are taken on the problem, an output voltage amplitude is set large by the timing controller beforehand so that even if a given video signal line is affected by wiring crosstalk from the neighboring video signal line, an effective voltage amplitude of the corresponding video signal may not become lower than an input amplitude specification value for the data driver. However, the output voltage amplitude is set large beforehand, so that a new problem occurs in an increase in dissipation power. That is, in a case where wiring crosstalk has a large degree of an influence so that an effective voltage amplitude may be decreased, when an output voltage amplitude is set beforehand so that the effective voltage amplitude may become slightly greater than an input amplitude specification value for the data driver and if a video signal is input which may be less affected by the neighboring video signal line as in the case of the Gradation pattern [1] or [2] in FIG. 10, for example, the effective voltage amplitude increases and exceeds the input amplitude specification value for the data driver more than necessary, thereby dissipating extra power. Further, in such a case, there occurs a problem in that EMI may increase due to the effective voltage amplitude in excess of the input amplitude specification value for the data driver more than necessary.

FIG. 12 is a block diagram for showing an electrical configuration of important components of the image display device that countermeasures are taken on the problem.

As shown in FIG. 12, the image display device includes data drivers $\mathbf{13}_1, \mathbf{13}_2, \ldots, \mathbf{13}_M$, and $\mathbf{13}_{M+1}$, a timing controller 14, and video signal lines 15; it further includes a scan driver and a display panel which are not shown but similar to the scan driver 2 and the display panel 1 in FIG. 7 respectively. The video signal line is arranged similar to the video signal line 5 in FIG. 7. The timing controller 14 has a data signal output section 14*a*, a video signal processing section 14*b*, a transmission voltage amplitude controlling section 14*c*, and a resistor 14*d*. The video signal processing section 14*b* rearranges a video signal vi into a signal receivable by the data drivers $\mathbf{13}_1, \mathbf{13}_2, \ldots, \mathbf{13}_M$, and $\mathbf{13}_{M+1}$. The transmission voltage amplitude controlling section 14*c* sets the amplitude of a transmission voltage based on a resistance value of the resistor 14*d*, to adjust the output voltage amplitude of a data signal vj which is output from the data signal output section 14*a*. The resistance value of the resistor 14*d* is determined by performing EMI evaluation. In the EMI evaluation, EMI properties are measured by changing the resistance value of the resistor 14*d* by trial and error, to determine such a resistance value that the EMI properties may be optimized.

In the present image display device, the video signal vi is input to the timing controller 14, in which it is processed using the video signal processing section 14*b* to generate an input signal va. The amplitude of the transmission voltage is set optimally in the transmission voltage amplitude controlling section 14*c* based on the resistance value of the resistor 14*d*, to give a data signal vj having the adjusted output voltage amplitude, which signal is then output from the data signal output section 14*a*. The data signal vj is transmitted via the video signal lines 15 to the data drivers $\mathbf{13}_1, \mathbf{13}_2, \ldots, \mathbf{13}_M$, and $\mathbf{13}_{M+1}$ respectively. Then, an image corresponding to the video signal vi is displayed on the display panel.

However, the resistance value of the resistor 14*d* is determined on the basis of results of the EMI evaluation and the video signal line 15 transmits the data signal vj having an effective voltage amplitude that corresponds to the adjusted output voltage amplitude. That is, the ultimately adjusted output voltage amplitude becomes a fixed value irrespective of the input video signal vi. Despite this, the video signal vi input to the timing controller 14 comes in various types, so that as the video signal vi, that is, a display pattern varies, the degree of the influence from wiring crosstalk changes. That is, the video signal vi changes always and, correspondingly the effective voltage amplitude also changes momentarily. Therefore, if the output voltage amplitude is determined as a fixed value based on the resistance value of the resistor 14*d* beforehand, the effective voltage amplitude of the data signal vj transmitted via the video signal line 15 may not be an efficient value that responds to a change in video signal vi.

This causes the effective voltage amplitude in the present image display device to exceed the input amplitude specification value for the data drivers $\mathbf{13}_1, \mathbf{13}_2, \ldots, \mathbf{13}_M$, and $\mathbf{13}_{M+1}$ more than necessary depending on the input video signal vi, thereby increasing dissipation power and EMI. Moreover, in the recent years, the size and the resolution of image display devices are ever-increasing. This progress in technology increases the number of video signal lines required and clearly swelling dissipation power and EMI, so that it is desirable to transmit the video signal having an efficient effective voltage amplitude through the video signal line.

Besides the present image display device, this type of related art may include, for example, a liquid crystal display (LCD) described in Japanese Patent Application Laid-open No. Hei11-174406 (hereinafter, referred to as the related-art Patent Document 1).

In the LCD, a driver integrated circuit (IC) drives a liquid crystal panel so that an image may be displayed on the panel. The IC includes an output circuit, which output circuit controls the output of a transfer clock signal and a display signal, which is a logical signal, so that the logical signal may be supplied to the driver IC for the purpose of driving image display. In particular, in the present IC, the output current performance or the rising edge or trailing edge properties of the output voltage of the output circuit can be changed from the outside. In this case, the properties are made variable by applying a predetermined voltage from the outside. Alternatively, the properties are made variable by connecting a resistor externally.

Further, in a data drive device in an LCD described in Japanese Patent Application Laid-open No. 2003-208134 (hereinafter, referred to as the related-art Patent Document 2), a timing controller is used to arrange pixel data pieces input from the outside, a voltage of which data is then stepped down with a resistance voltage divider and output to a plurality of data transmission lines. The data signal transmitted via the plurality of data transmission lines is stepped up to an original driving voltage with a level shift array and then converted into an analog pixel voltage signal with a data driver and supplied to a data line. This will reduce EMI.

However, the above-mentioned related arts have the following problems.

That is, the LCD described in the related-art Patent Document 1 cannot solve the above-mentioned problems because it does not take into account an influence from wiring crosstalk although the output current performance or the rising edge or trailing edge properties of the output voltage of the output circuit can be changed with an externally applied voltage or an externally connected resistor.

The data drive device described in the related-art Patent Document 2 has a problem in that its hardware configuration may be complicated because it needs level converting means such as a resistance voltage divider or a level shift array immediately on the upstream side of a data driver, which resistance voltage divider is used to step down a data voltage and which level shift array is used to step it up to its original driving voltage for the purpose of reducing EMI. Further, similar to the related-art Patent Document 1, it does not take into account a change in transmission voltage amplitude caused by wiring crosstalk and is considered to be easily affected by external noise.

In view of the above, the present invention has been developed, and it is an object of the present invention to provide an image display device and a video signal processing method used in the same that can avoid a transmission error due to wiring crosstalk when a video signal is being transmitted via a video signal line by utilizing a differential transmission system.

SUMMARY OF THE INVENTION

According to a first aspect of the present invention, there is provided an image display device including:

a display panel;

a data signal transmission line to transmit a data signal therethrough;

a display controlling unit to generate and output the data signal based on an input video signal; and a display panel driving unit to drive the display panel based on the data signal supplied from the display controlling unit via the data signal transmission line, wherein in the display panel driving unit, an input amplitude specification value is set to define a minimum reference voltage amplitude of the data signal for the display panel driving unit to operate properly; and wherein the display controlling unit includes a voltage amplitude adjusting unit to decide a degree of an influence from wiring crosstalk between signal lines making up the data signal transmission line and, based on a result of the decision, adjust the voltage amplitude of the data signal so as to exceed the input amplitude specification value by a predetermined value.

According to a second aspect of the present invention, there is provided a video signal processing method which is used in an image display device including a display panel; a data signal transmission line to transmit a data signal therethrough; a display controlling unit to generate and output the data signal based on an input video signal; and a display panel driving unit to drive the display panel based on the data signal supplied from the display controlling unit via the data signal transmission line, the display controlling unit includes a voltage amplitude adjusting unit, the method including:

setting an input amplitude specification value in the display panel driving unit, to define a minimum reference voltage amplitude of the data signal for the display panel driving unit to operate properly; and performing a processing in which the voltage amplitude adjusting unit decides a degree of an influence from wiring crosstalk between signal lines making up the data signal transmission line and, based on a result of the decision, adjusts the voltage amplitude of the data signal so as to exceed the input amplitude specification value by a predetermined value.

With the configurations of the present invention, it is possible to provide an image display device that can inhibit wiring crosstalk so that display noise may be avoided, while at the same time inhibiting EMI and reducing dissipation power.

DESCRIPTION OF THE PREFERRED EMBODIMENTS

Figure 1:
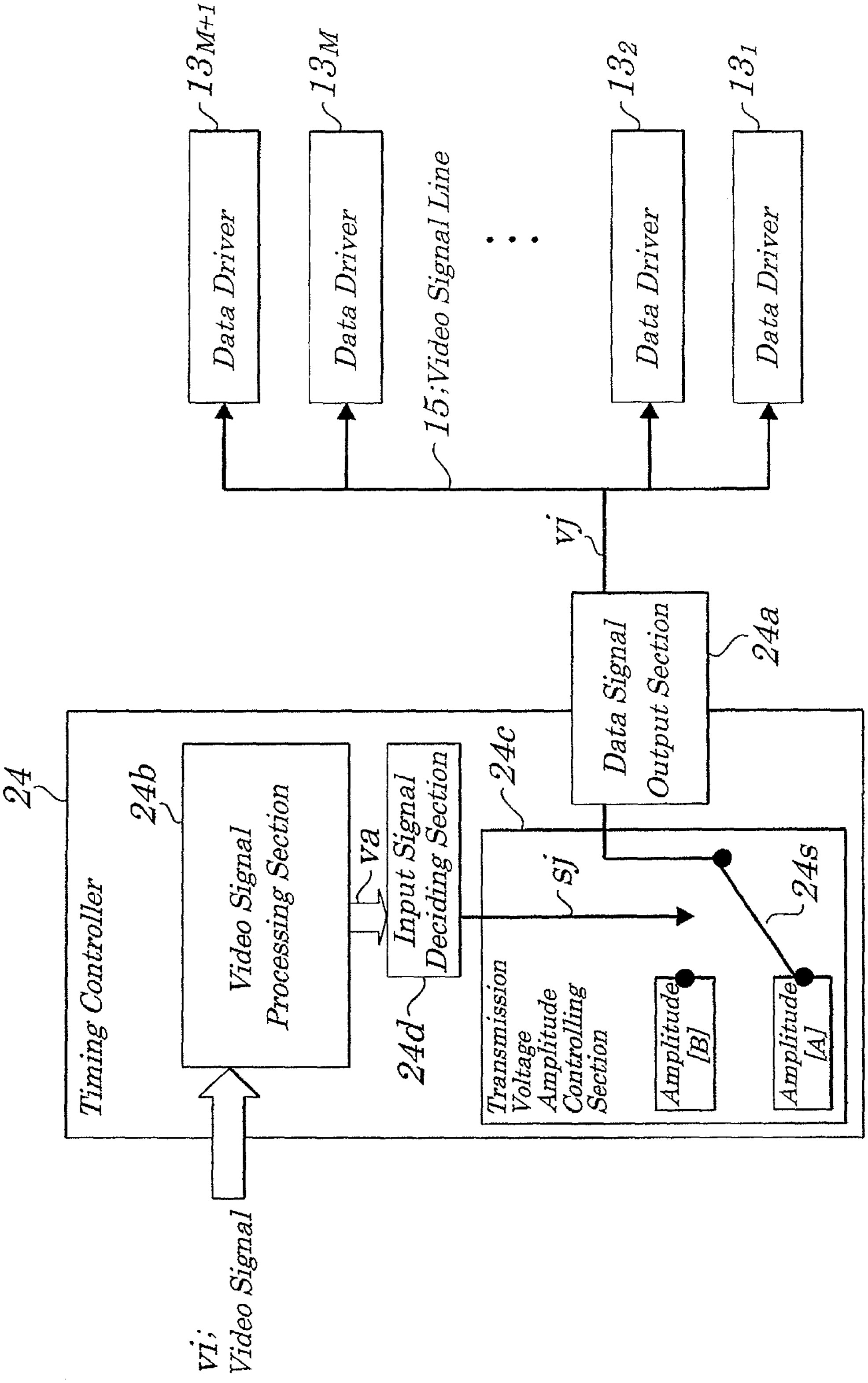
FIG. 1 is a block diagram for showing an electric configuration of important components of an image display device according to a first exemplary embodiment of the present invention.

Best modes of carrying out the present invention will be described in further detail using various embodiments with reference to the accompanying drawings.

A preferable mode is one wherein the display panel includes a plurality of columns of data lines, a plurality of rows of scanning lines, and a plurality of pixels which are positioned at intersections of the data lines and the scanning lines; wherein the display panel driving unit includes a data line driving circuit that writes pixel data based on the supplied data signal to each of the data lines based on a provided first control signal and a scanning line driving circuit that outputs a scanning line driving signal to drive the scanning lines in predetermined order based on a provided second control signal; wherein the data signal transmission line is configured to transmit the data signal therethrough by utilizing a differential transmission system; wherein the display controlling unit is configured to generate an input signal receivable by the data line driving circuit based on the input video signal, provide the data line driving circuit with the first control signal, set the voltage amplitude of the input signal, and outputs the input signal having the set voltage amplitude as the data signal through the data signal transmission line, while providing the scanning line driving circuit with the second control signal; wherein in the data line driving circuit, an input amplitude specification value is set to define a minimum reference voltage amplitude of the data signal for the data line driving circuit to operate properly; and wherein the voltage amplitude adjusting unit is configured to decide the degree of the influence from the wiring crosstalk between signal lines of the data signal transmission line at each predetermined timing and, based on the result of the decision, adjust the voltage amplitude of the data signal so as to exceed the input amplitude specification value by the predetermined value.

Also, a preferable mode is one wherein the data signal transmission line has a plurality of signal lines to transmit at least an arbitrary gradation level of the video signal, the plurality of signal lines divided into every two neighboring signal lines which transmit as a signal line pair the mutually reverse-phase data signals for complying with the differential transmission system; and wherein the voltage amplitude adjusting unit is configured to decide the degree of the influence from the wiring crosstalk between two neighboring signal line pairs at each of the predetermined timings, based on the input signal generated by the display controlling unit, and to adjust the voltage amplitude of the data signals so as to exceed the input amplitude specification value by the predetermined value, based on the result of the decision.

Further, the voltage amplitude adjusting unit is configured to adjust the voltage amplitude of the data signals to a value close to and in excess of the input amplitude specification value.

A further preferable mode is one wherein when a first signal line making up a first signal line pair out of the two neighboring signal line pairs and a second signal line making up a second signal line pair out of the two neighboring signal line pairs are adjacent to each other, and a first data signal transmitted through the first signal line and a second data signal transmitted through the second signal line are in different states in logical level, the voltage amplitude adjusting unit is configured to adjust the voltage amplitude of the data signals to be greater than that of the data signals at a time when the first data signal and the second data signal are in same states in logical level.

Further, the voltage amplitude adjusting unit includes an input signal deciding unit that decides a degree of an influence from wiring crosstalk between the two neighboring signal line pairs based on the input signal at each of the predetermined timings, a transmission voltage amplitude controlling section that controls the voltage amplitude of the data signals so as to exceed the input amplitude specification value by a predetermined value, based on a result of the decision by the input signal deciding unit, and a data signal output section that sends the data signals having the voltage amplitude controlled by the transmission voltage amplitude controlling section, to the data line driving circuit via the data signal transmission line.

Further, the input signal deciding unit stores beforehand a decision condition in accordance with which the degree of the influence from the wiring crosstalk between the pair of the neighboring signal lines is decided on the basis of the input signal at each of the predetermined timings and the transmission voltage amplitude controlling section has a voltage amplitude value selecting unit configured to hold beforehand a plurality of controlling voltage amplitude values therein that are used to control the voltage amplitude of the data signal and, based on the result of the decision by the input signal deciding unit, select the voltage amplitude of the data signal out of the controlling voltage amplitude values and set it. Further, the input signal deciding unit has storage section configured to store the decision condition, which storage section are arranged to be attachable to and detachable from the input signal deciding unit. Further, the transmission voltage amplitude controlling section has voltage amplitude value varying section configured to continually control the voltage amplitude of the data signal based on the result of the decision by the input signal deciding unit.

Further, there is provided an effective voltage amplitude detecting section that detects, as an effective voltage amplitude, a voltage amplitude of the data signal on the data signal transmission line in an immediately vicinity of the data line driving circuit and then outputs a value of the effective voltage amplitude; and the voltage amplitude adjusting unit includes an effective voltage amplitude deciding section that decides whether the value of the effective voltage amplitude (hereinafter, may be referred to as effective voltage amplitude value) is larger or smaller than the input amplitude specification value at each of the predetermined timings, a transmission voltage amplitude controlling section that controls the voltage amplitude of the data signal so as to exceed the input amplitude specification value by a predetermined value based on the result of the decision by the effective voltage amplitude deciding section, and a data signal output section that sends the data signal whose voltage amplitude has been controlled by the transmission voltage amplitude controlling section to the data line driving circuit via the data signal transmission line. Further, the effective voltage amplitude detecting section is disposed in the vicinity of the data line driving circuit, to detect the effective voltage amplitude and perform analog/digital conversion on its value and then output a digital value of the effective voltage amplitude. The degree of the influence from the wiring crosstalk is the degree of attenuation of the voltage amplitude of the data signal transmitted through the data signal transmission line.

First Exemplary Embodiment

FIG. 1 is a block diagram for showing the electric configuration of important components of an image display device according to the first exemplary embodiment of the present invention.

Figure 7:
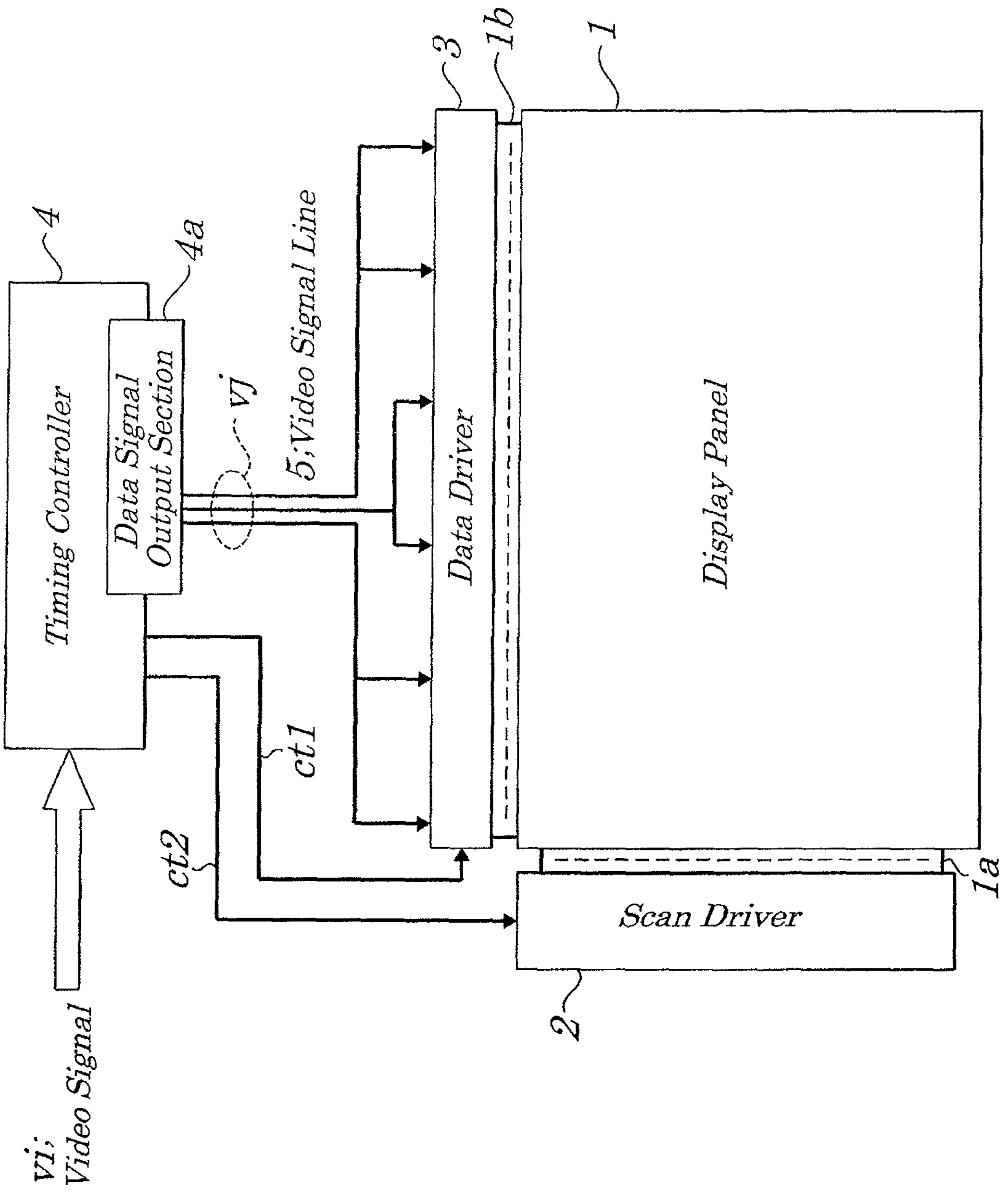
FIG. 7 is a block diagram of a related image display device.
Figure 12:
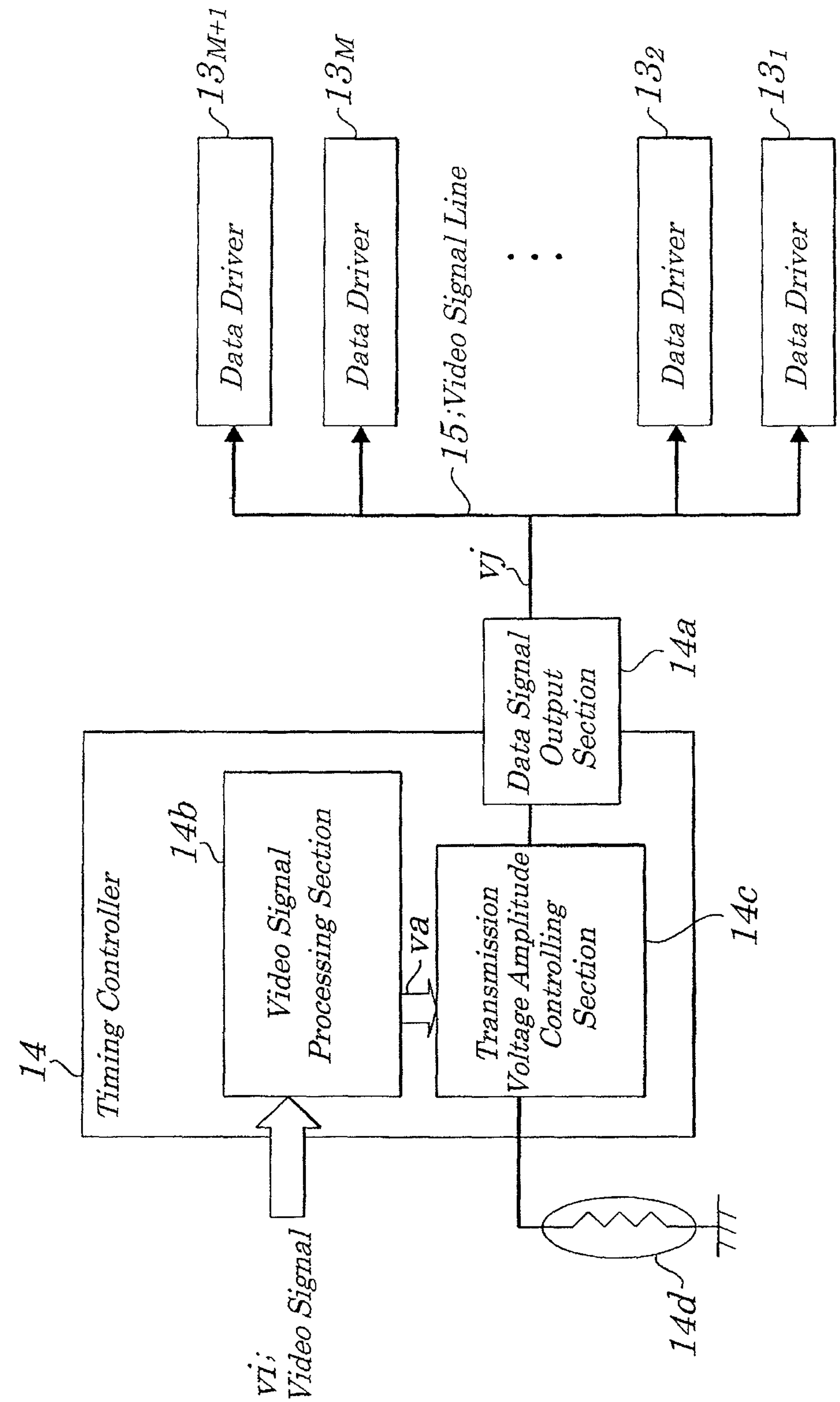
FIG. 12 is a block diagram for showing an electrical configuration of important components of the image display device that countermeasures are taken on the problem.

As shown in the figure, the image display device of the present invention includes data drivers $\mathbf{13}_1$, $\mathbf{13}_2$, . . . , $\mathbf{13}_M$, and $\mathbf{13}_{M+1}$ and a video signal line 15 similar to those of the image display device in FIG. 12 as well as a scan driver and a display panel which are not shown and similar to the scan driver 2 and the display panel 1 respectively in FIG. 7. Further, in the present image display device, the timing controller 14 in FIG. 12 is replaced with a timing controller 24 having different functions. The timing controller 24 includes a video signal processing section 24*b*, an input signal deciding section 24*d*, a transmission voltage amplitude controlling section 24*c*, and a data signal output section 24*a*.

The video signal processing section 24*b* rearranges an externally input video signal vi into a signal receivable by the data drivers $\mathbf{13}_1$, $\mathbf{13}_2$, . . . , $\mathbf{13}_M$, and $\mathbf{13}_{M+1}$, to generate an input signal va. Based on the input signal va generated in the video signal processing section 24*b*, the input signal deciding section 24*d* decides the degree of an influence from wiring crosstalk between mutually neighboring paired signal lines of the video signal line 15 at, for example, each frame period and provides a decision result sj. In particular, in the present exemplary embodiment, the input signal deciding section 24*d* stores beforehand a decision condition in accordance with which the degree of the influence from the wiring crosstalk between the mutually neighboring paired signal lines of the video signal line 15 is decided on the basis of the input signal va at, for example, each of the frame periods. The degree of the influence from the wiring crosstalk is the degree of attenuation of the voltage amplitude of the data signal vj transmitted through the video signal line 15. In this case, the input signal deciding section 24*d* decides the degree of attenuation by comparing the polarity (that is, "H" or "L" level) of the data signal sequentially output from the timing controller 24 to the video signal line (for example, mutually neighboring signal lines of the video signal line 15) possibly susceptible to the wiring crosstalk to the polarity ("H" or "L" level) of the neighboring data signal which is output to the neighboring signal line simultaneously with the former data signal. This comparison of the polarities may be realized by using, for example, a comparator.

Based on the decision result sj by the input signal deciding section 24*d*, the transmission voltage amplitude controlling section 24*c* conducts control so that a voltage amplitude of the data signal vj output from the data signal output section 24*a* may become a value close to and in excess of an input amplitude specification value by a predetermined value for the data drivers $\mathbf{13}_1$, $\mathbf{13}_2$, . . . , $\mathbf{13}_M$, and $\mathbf{13}_{M+1}$, that is, a smallest possible value at which the data drivers $\mathbf{13}_1$, $\mathbf{13}_2$, . . . , $\mathbf{13}_M$, and $\mathbf{13}_{M+1}$ will not malfunction. Specifically, if the mutually neighboring signal lines of the pair transmit the different logical levels of the data signal vj, the transmission voltage amplitude controlling section 24*c* compares this condition to a condition where those logical levels agree and adjusts the value of the voltage amplitude of the data signal vj to become whichever is larger. It is to be noted that the transmission voltage amplitude controlling section 24*c* holds beforehand controlling voltage amplitude values (amplitudes [A] and [B]) used to control the voltage amplitude of the data signal vj and, based on the decision result sj by the input signal deciding section 24*d*, selects one of the controlling voltage amplitude values (amplitudes [A] and [B]) by using a switch 24*s* and sets it. The data signal output section 24*a* sends the data signal vj having the voltage amplitude controlled by the transmission voltage amplitude controlling section 24*c*, to the data drivers $\mathbf{13}_1$, $\mathbf{13}_2$, . . . , $\mathbf{13}_M$, and $\mathbf{13}_{M+1}$ via the video signal line 15.

Figure 10:
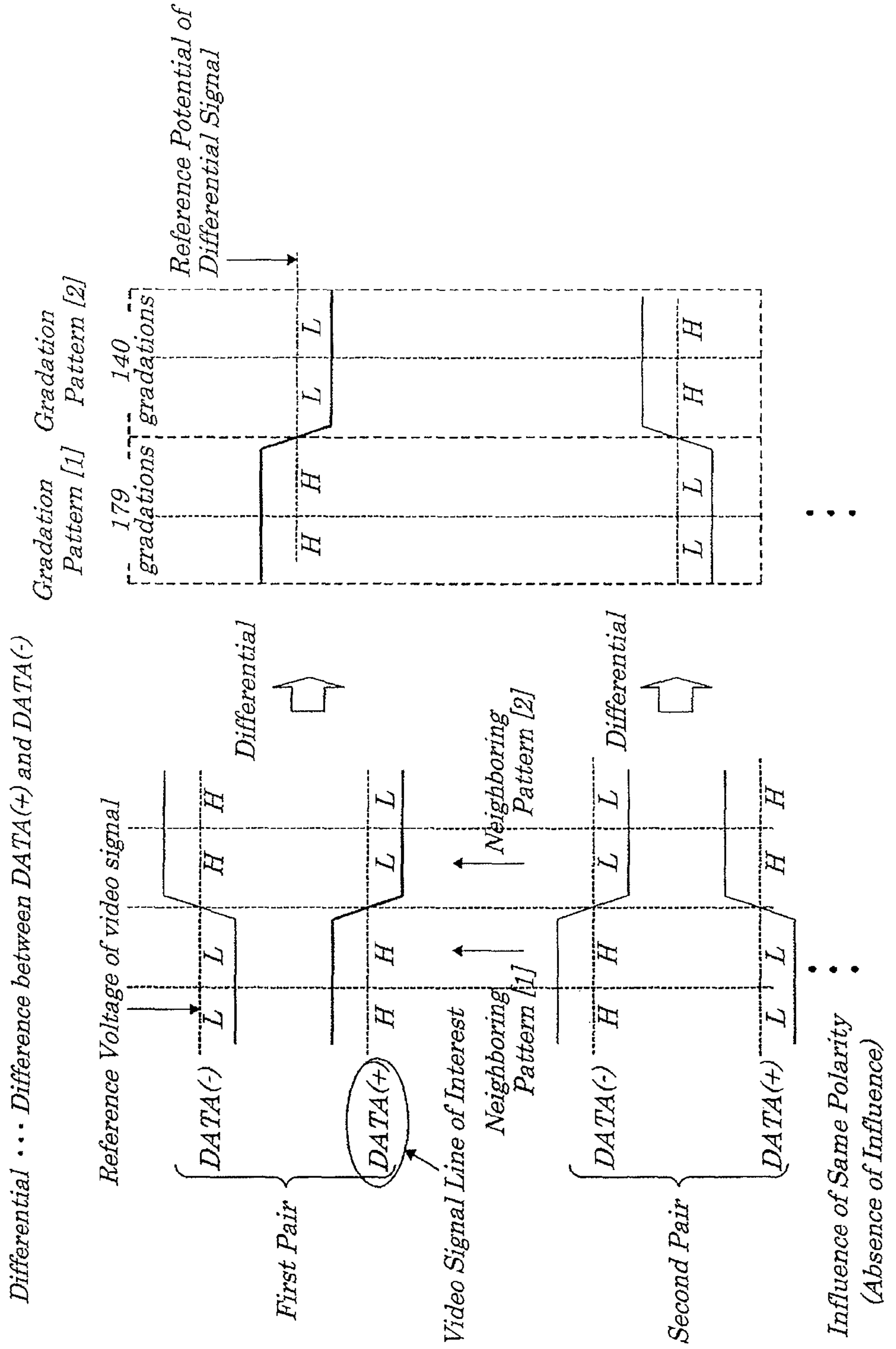
FIG. 10 is a chart for showing effects of wiring crosstalk received from the data signal vj transmitted through the neighboring video signal lines.
Figure 11:
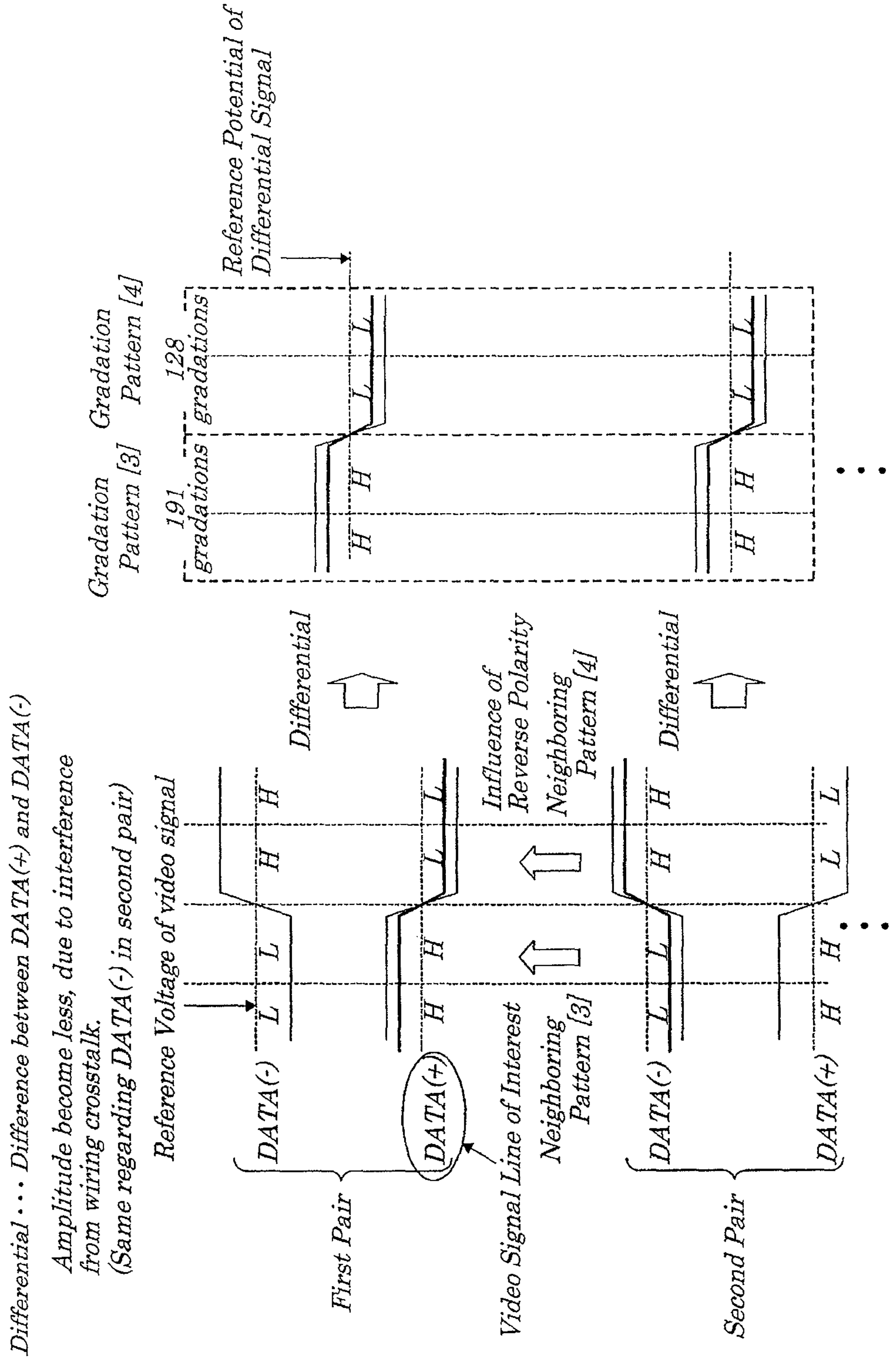
FIG. 11 is another chart for showing the effects of the wiring crosstalk received from the data signal vj transmitted through the neighboring video signal lines.

The transmission voltage amplitude controlling section 24*c* has the switch 24*s* for setting one of the two amplitudes selectively, which switch 24*s* is used to select one of the two amplitudes [A] and [B] that corresponds to one of the Gradation patterns [1] and [2] shown in FIG. 10 and those [3] and [4] shown in FIG. 11. It is here assumed that the amplitude [A]>the amplitude [B]. If the data signal vj transmitted through the video signal line 15 takes on the Gradation pattern [1] or [2] in FIG. 10, that is, in the case of the input signal va generated in the video signal processing section 24*b*, the input signal deciding section 24*d* decides that the degree of the influence from wiring crosstalk is small and, based on its decision result sj, controls the switch 24*s* so that the smallest amplitude [A] of the two amplitudes may be selected and then outputs the data signal vj that corresponds to the amplitude [A] from the data signal output section 24*a*. On the other hand, if the data signal vj transmitted through the video signal line 15 takes on the Gradation pattern [3] or [4] in FIG. 11, the input signal deciding section 24*d* decides that the degree of the influence from the wiring crosstalk is large and, based on its decision result sj, controls the switch 24*s* so that the amplitude [B] greater than the amplitude [A] may be selected and then outputs the data signal vj that corresponds to the amplitude [B] from the data signal output section 24*a*.

Figure 8:
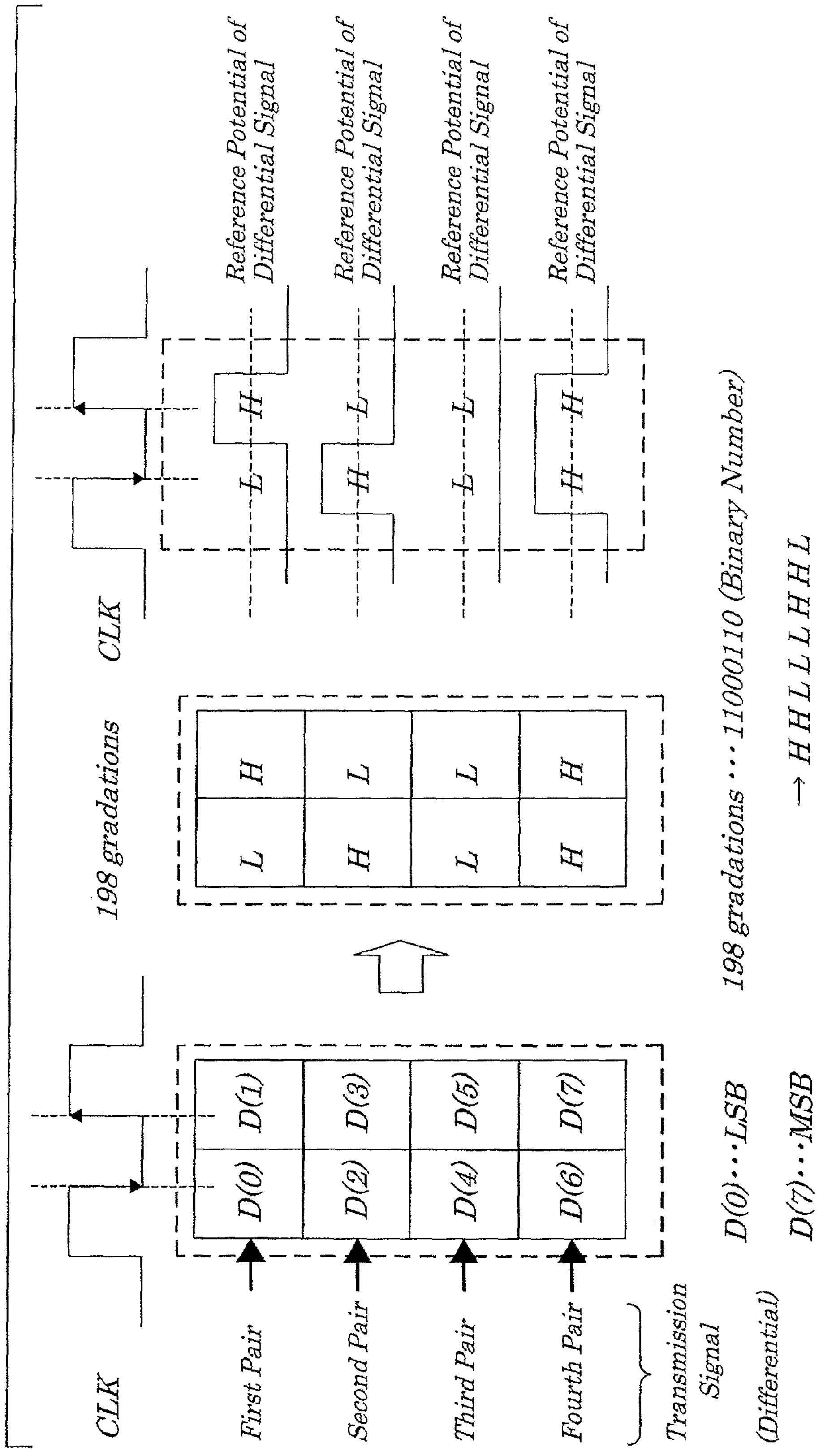
FIG. 8 is an explanatory diagram of a transmission format for an RSDS signal.
Figure 9:
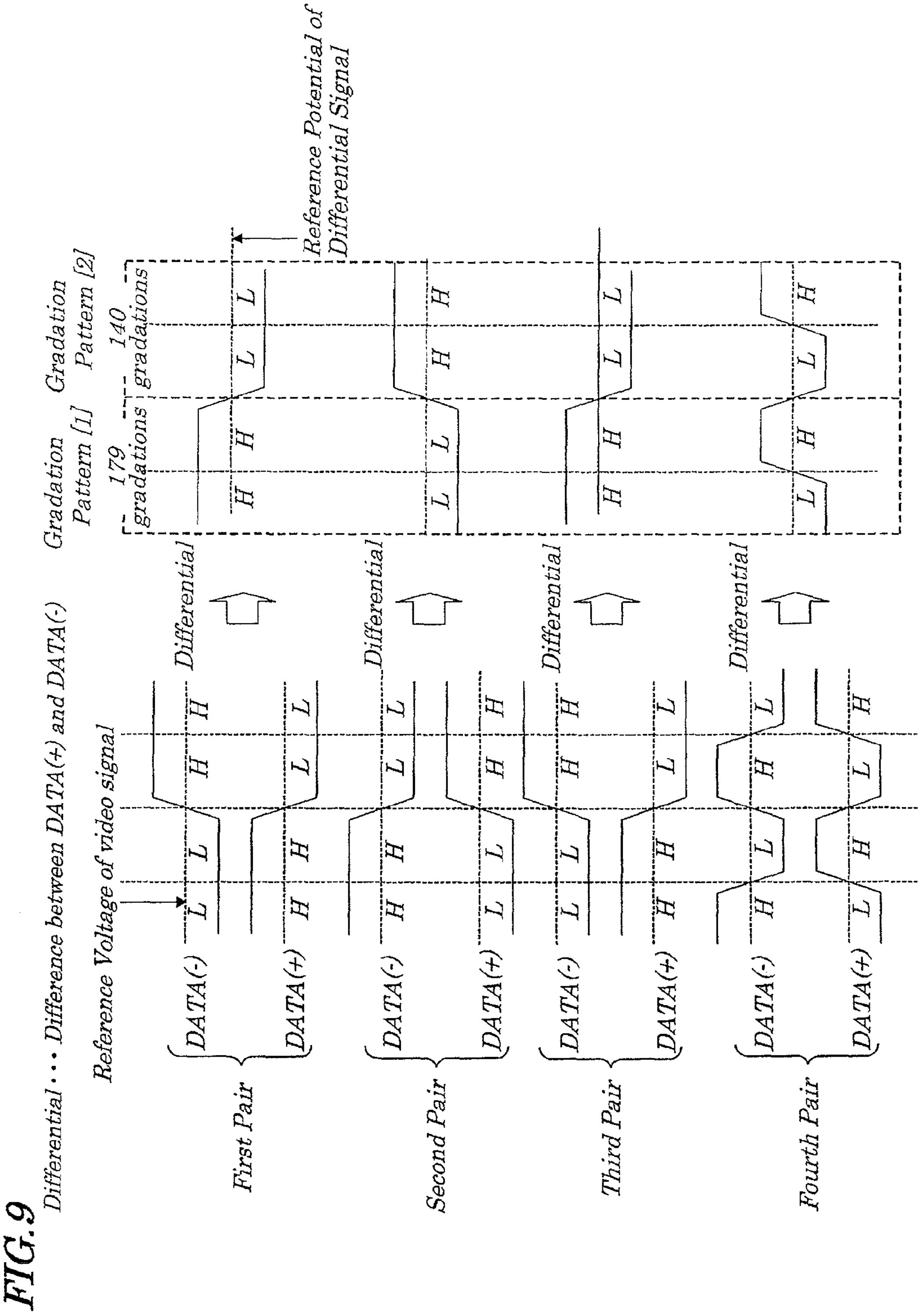
FIG. 9 is a chart for showing an example of waveforms of a data signal vj transmitted through a video signal line 5.

In such a manner, by deciding the degree of the influence from wiring crosstalk based on the incoming video signals vi and selecting an amplitude value that corresponds to the degree of the influence by using the switch 24*s* and then outputting it from the data signal output section 24*a*, an efficient effective voltage amplitude can be obtained. It is to be noted that the efficient effective voltage amplitude is an effective voltage amplitude value that slightly exceeds the input amplitude specification value for the data drivers $\mathbf{13}_1$, $\mathbf{13}_2$, . . . , $\mathbf{13}_M$, and $\mathbf{13}_{M+1}$. In FIGS. 10 and 11, the data signal vj transmitted to the video signal line 15 is schematically shown as a digital signal. The data signal vj is assumed to be a digital signal representative of, for example, eight-bit gradation data and transmitted through the signal lines arranged in order of those bits, in accordance with the RSDS transmission format shown in FIG. 8. In particular, as for the first and second pairs of video signal lines in FIG. 10, a voltage amplitude of the data signal output from the data signal output section 24*a* is shown and, as for the DATA (−) signal line in the first pair, an effective voltage amplitude is shown which takes into account an influence from the data signal transmitted through the neighboring video signal line.

Figure 2:
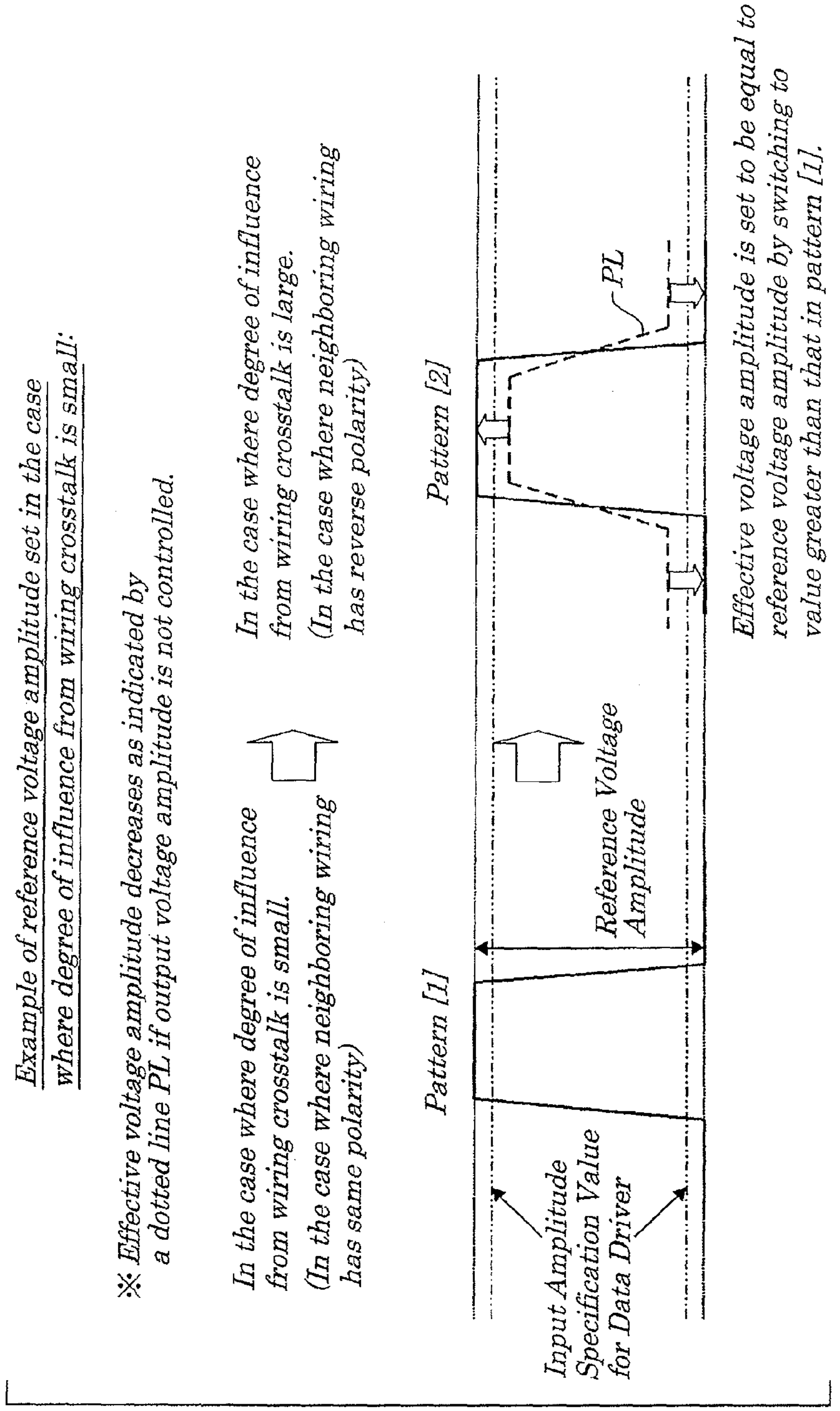
FIG. 2 is a schematic diagram for showing an influence from wiring crosstalk and controlling of an effective voltage amplitude.
Figure 3:
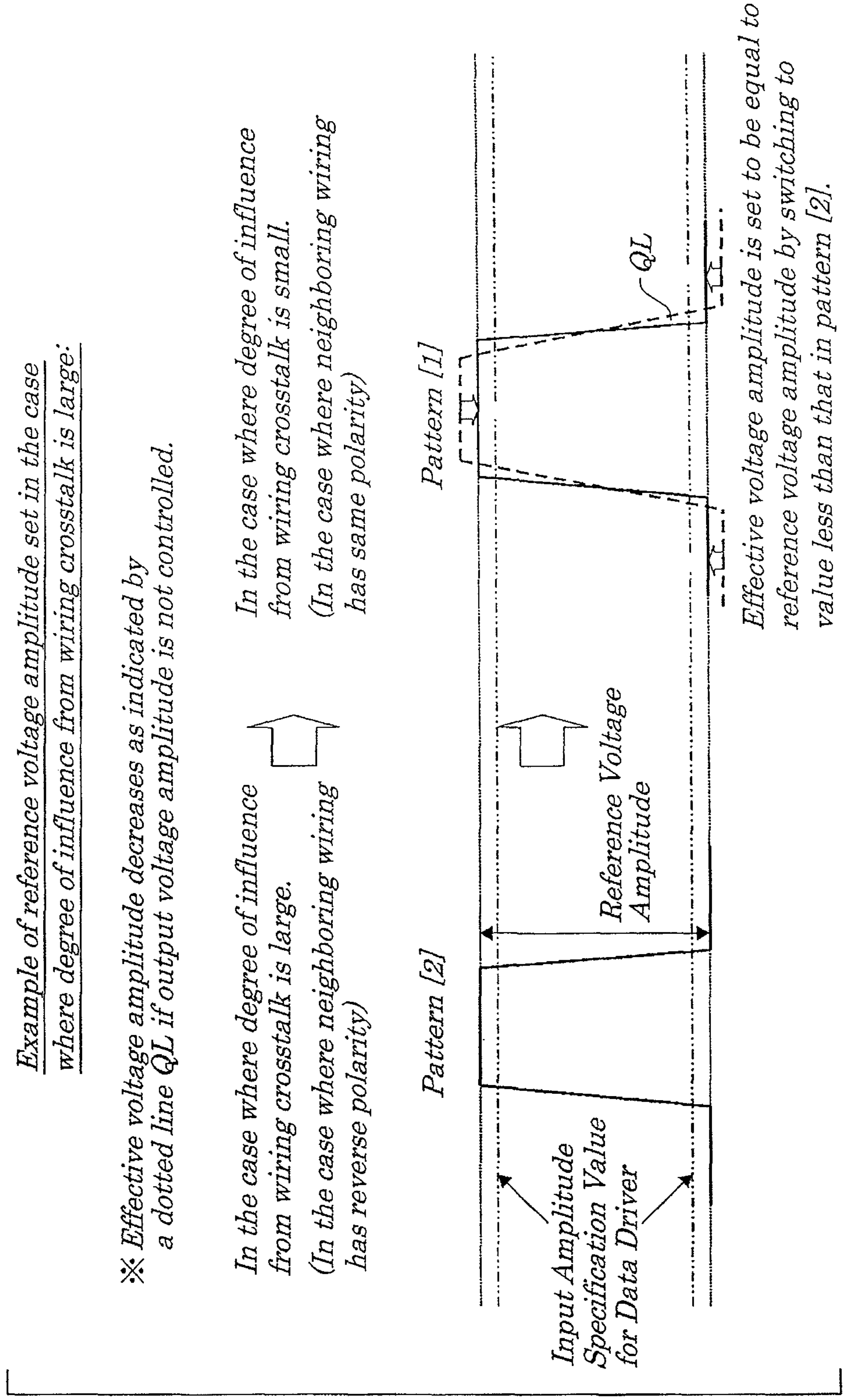
FIG. 3 is another schematic diagram for showing the influence from wiring crosstalk and controlling of the effective voltage amplitude.

FIGS. 2 and 3 are a schematic diagram for showing an influence from wiring crosstalk and controlling of an effective voltage amplitude.

With reference to FIGS. 10 and 11, a description will be given of the processing contents of a video signal processing method employed in the image display device of the present exemplary embodiment.

In the present image display device, based on the input signal va generated by the video signal processing section 24*b* in the timing controller 24, the degree of an influence from wiring crosstalk between the mutually neighboring paired signal lines is decided at, for example, each frame period and, based on a result of the decision, a voltage amplitude of the data signal vj is adjusted to become greater than an input amplitude specification value for the data drivers $\mathbf{13}_1$, $\mathbf{13}_2$, . . . , $\mathbf{13}_M$, and $\mathbf{13}_{M+1}$ by the predetermined value (voltage amplitude adjustment processing). In the voltage amplitude adjustment processing, the timing controller 24 adjusts the voltage amplitude of the data signal vj to become a smallest possible value at which the data drivers $\mathbf{13}_1$, $\mathbf{13}_2$, . . . , $\mathbf{13}_M$, and $\mathbf{13}_{M+1}$ will not malfunction. In this case, if the mutually neighboring paired signal lines transmit the different logical levels of the data signals vj, this condition is compared to a condition where those logical levels agree and, the voltage amplitude of the data signal will be adjusted to be whichever is larger.

That is, in the voltage amplitude adjustment processing, based on the input signal va, the input signal deciding section 24*d* decides the degree of an influence fromwiring crosstalk-between the mutually neighboring paired signal lines at, for example, each frame period (input signal decision processing). Based on the decision result sj by the input signal deciding section 24*d*, the transmission voltage amplitude controlling section 24*c* conducts control so that the voltage amplitude of the data signal vj may be slightly greater than the input amplitude specification value by the predetermined-value (transmission voltage amplitude control processing). The data signal output section 24*a* sends the data signal vj having the voltage amplitude controlled by the transmission voltage amplitude controlling section 24*c*, to the data drivers $\mathbf{13}_1$, $\mathbf{13}_2$, . . . , $\mathbf{13}_M$, and $\mathbf{13}_{M+1}$ via the video signal line 15 (data signal output processing).

It is to be noted that the input signal deciding section 24*d* stores beforehand a decision condition in accordance with which the degree of the influence from the wiring crosstalk between the neighboring paired signal lines is decided on the basis of the input signal va at, for example, each frame period. The transmission voltage amplitude controlling section 24*c* holds beforehand a plurality of controlling voltage amplitude values used to control the voltage amplitude of the data signal vj and, based on the decision result sj from the input signal deciding section 24*d*, selects the voltage amplitude of the data signal vj out of the controlling voltage amplitude values and sets it (voltage amplitude value selection processing). The degree of the influence from the wiring crosstalk is the degree of attenuation of the voltage amplitude of the data signal vj transmitted through the data signal transmission line 15.

Further, as shown in FIG. 10, if the input video signal vi is of 179 gradations (Gradation pattern [1]), that is, the digital signal has a bit string of "HLHHLLHH" ("10110011"), the video signal line of interest and the DATA(−) signal line share the same polarity of "H"; and also if the input video signal vi is of 140 gradations (Gradation pattern [2]), they share the same polarity of "L".

Accordingly, the effective voltage amplitude of the video signal line of interest is not subjected to wiring crosstalk from the neighboring pair, so that the degree of an influence from the data signal vj being transmitted will be minimized. For this reason, the output voltage amplitude of the data signal vj provided from the data signal output section 24*a* in the timing controller 24 agrees with its effective voltage amplitude. The output voltage amplitude of the data signal vj is set beforehand so that an effective voltage amplitude in a case where the degree of an influence from wiring crosstalk is minimal may be the smallest possible value not less than an input amplitude specification value for the data drivers $\mathbf{13}_1$, $\mathbf{13}_2$, . . . , $\mathbf{13}_M$, and $\mathbf{13}_{M+1}$, that is, a value slightly greater than the input amplitude specification value. Hereinafter, an amplitude slightly greater than the input amplitude specification value for the data drivers $\mathbf{13}_1$, $\mathbf{13}_2$, . . . , $\mathbf{13}_M$, and $\mathbf{13}_{M+1}$ is referred to as a "reference voltage amplitude".

Further, as shown in FIG. 11, if the input video signal vi is of 191 gradations (Gradation pattern [3]), that is, the digital signal has a bit string of "HLHHHHHH" ("10111111"), the video signal line of interest has the "H" polarity but the DATA (−) signal line in the neighboring pair has the reverse polarity of "L"; similarly, if it is of 128 gradations (Gradation pattern [4]), that is, the digital signal has a bit string of "HLLLLLL" ("10000000"), the video signal line of interest has the "L" polarity but the DATA(−) signal line in the neighboring pair has the reverse polarity of "H". Accordingly, the data signal being transmitted through the video signal line of interest is subjected to interference of the DATA (—) signal line in the neighboring pair, so that the effective voltage amplitude of the data signal becomes smaller than the output voltage amplitude of the data signal vj output from the data signal output section 24*a* in the timing controller 24. In the present exemplary embodiment, even if the effective voltage amplitude of the data signal being transmitted through the signal lines of the video signal line 15 changes due to interference of the data signal being transmitted through the neighboring signal line, in response to the change (change in degree of the interference), control will be conducted to switch to a larger value the output voltage amplitude of the data signal vj output from the data signal output section 24*a* in the timing controller 24 so that the effective voltage amplitude may agree with the reference voltage amplitude.

FIG. 2 shows schematically how control is conducted to switch the output voltage amplitude of the timing controller 24 in response to the incoming video signal vi so that whatever video signal vi is input, the effective voltage amplitude may be slightly greater than the input amplitude specification value for the data drivers $\mathbf{13}_1$, $\mathbf{13}_2$, . . . , $\mathbf{13}_M$, and $\mathbf{13}_{M+1}$.

That is, a reference voltage amplitude is set beforehand in a case of pattern [1] where the degree of an influence from wiring crosstalk is small, so that the effective voltage amplitude which decreases as indicated by a dotted line PL if the output voltage amplitude of the data signal vj is not controlled even with an increase in degree of the influence will be switched to a value greater than that in pattern [1] so that the effective voltage amplitude may be equal to the reference voltage amplitude.

Summarizing the above, in a condition of providing the Gradation pattern [2] or the Gradation pattern [1] where the degree of an influence on the data signal being transmitted through one of the signal lines of the video signal line 15 given from the data signal being transmitted through the neighboring signal line is minimized, the output voltage amplitude of the data signal vj is set to a smallest possible value not less than an input amplitude specification value for the data drivers $\mathbf{13}_1$, $\mathbf{13}_2$, . . . , $\mathbf{13}_M$, and $\mathbf{13}_{M+1}$ (that is, value slightly greater than the input amplitude specification value). On the other hand, in a condition of providing the Gradation pattern [3] or [4], the data signal being transmitted through one of the signal lines of the video signal line 15 is subjected to interference of the data signal being transmitted through the neighboring signal line; therefore, the output voltage amplitude of the data signal vj is set equal to the reference voltage amplitude by switching the output voltage amplitude to a larger value to which a drop in voltage owing to the interference is added beforehand.

In such a manner, in the present image display device, the timing controller 24 is intended to switch its output voltage amplitude based on the incoming video signal vi and so includes the input signal deciding section 24*d* and the transmission voltage amplitude controlling section 24*c*. The input signal deciding section 24*d* decides the degree of interference with the data signal vj along the video signal line 15 which signal corresponds to the input signal va generated in the video signal processing section 24*b*, each time the video signal vi is received (for example, at each frame period). It decides the interference degree at each timing that the video signal vi is input, because if, for example, a 191-gradation signal is input at one point in time and then a 179-gradation signal is input, the degree of the interference changes timewise. It is to be noted that since the degree of interference with the data signal vj can be calculated beforehand by utilizing prior waveform evaluation (that is, evaluation intended to confirm beforehand the degree of a change in actual effective voltage amplitude based on waveforms by inputting the various video signals), information about the evaluation can be held in the input signal deciding section 24*d* in the timing controller 24 beforehand so that the voltage amplitude may be switched to a value that corresponds to the degree of the interference with the data signal vj. Of course, when, for example, the output voltage amplitude is changed significantly as a result of a decision at one timing and if a decision at the next timing also commands increasing the output voltage amplitude, the amplitude need not be changed at the next timing. That is, only at a timing decision is made which is different from the previous one, the output voltage amplitude needs to be changed.

Then, the input signal va decided in the input signal deciding section 24*d* is given an amplitude switching instruction in the transmission voltage amplitude controlling section 24*c* so that it may have a larger amplitude corresponding to the degree of interference, in accordance with which instruction the output voltage amplitude of the data signal vj is set to agree with the reference voltage amplitude, then the data signal vj is output from the data signal output section 24*a*. Accordingly, whatever video signal vi is input to the timing controller 24, the effective voltage amplitude of the data signal vj transmitted to the video signal line 15 can be set to a value of the reference voltage amplitude.

It is to be noted that as amplitude patterns of the output voltage amplitude of the data signal vj, it is necessary to prepare at least two types of patterns (hereinafter referred to as "amplitude patterns") as the Gradation pattern [1] (or the Gradation pattern [2]) and the Gradation pattern [3] (or the Gradation pattern [4]); however, the number of the types of the amplitude patterns to be prepared is not limited to two but may be N (N: integer of two or larger). In this case, the degree of an influence from wiring crosstalk can be decided in the input signal deciding section 24*d*, to select an optimal amplitude out of a plurality of the amplitude patterns so that the effective voltage amplitude of a data signal transmitted through a signal line of interest may be slightly greater than an input amplitude specification value for the data drivers and then switch the current amplitude pattern to the corresponding amplitude pattern. When switching the amplitude, it may be switched for each of the video signal lines or in units of a block including a plurality of them.

Further, as shown in FIG. 3, in a case where a reference voltage amplitude in the case of the pattern [2] in which wiring crosstalk has a larger degree of an influence is set, when the influence degree has increased and if the output voltage amplitude of the data signal vi is not controlled, an effective voltage amplitude at a time when the wiring crosstalk has a smaller influence degree will increase as indicated by a dotted line QL; in this case, however, by switching the current amplitude to a value smaller than that of the pattern [2], it may become equal to the reference voltage amplitude. In such a manner, control is conducted to switch the output voltage amplitude of the timing controller 24 in response to the incoming video signal vi so that whatever video signal vi is input, the effective voltage amplitude may be slightly greater than the input amplitude specification value for the data drivers $\mathbf{13}_1$, $\mathbf{13}_2$, . . . , $\mathbf{13}_M$, and $\mathbf{13}_{M+1}$.

It is here to be noted that in a case where the display panel of the present image display device has a resolution of, for example, a super extended graphics array (SXGA) with 1280 times 1024 pixels and an eight-bit data signal vj is sent to the data drivers $\mathbf{13}_1$, $\mathbf{13}_2$, . . . , $\mathbf{13}_M$, and $\mathbf{13}_{M+1}$ by utilizing the RSDS transmission system, a total of transmission pairs of the differential signal lines when the RSDS transmission system is utilized is 26 (=two ports×a total of 13 pairs (=one clock signal line pair+12 data line pairs)). In this case, if the amplitude of transmission voltages of those 26 pairs is reduced by 1 mV, the dissipation current is reduced by about 0.6 mA in one example. As the number of the signal lines of the video signal line 15 increases, the dissipation current increases proportionally, so that the transmission voltage amplitude should preferably be reduced as much as possible.

As so far described, based on the input signal va generated in the video signal processing section 24*b*, the degree of an influence from wiring crosstalk between mutually neighboring paired signal lines is decided at, for example, each frame period and, based on a result sj of the decision, the voltage amplitude of the data signal vj is adjusted so that it may be greater than the input amplitude specification value for the data drivers $\mathbf{13}_1$, $\mathbf{13}_2$, . . . , $\mathbf{13}_M$, and $\mathbf{13}_{M+1}$ by the predetermined value; accordingly, it is possible to reduce all of display noise due to wiring crosstalk, EMI, and dissipation power.

Second Exemplary Embodiment

Figure 4:
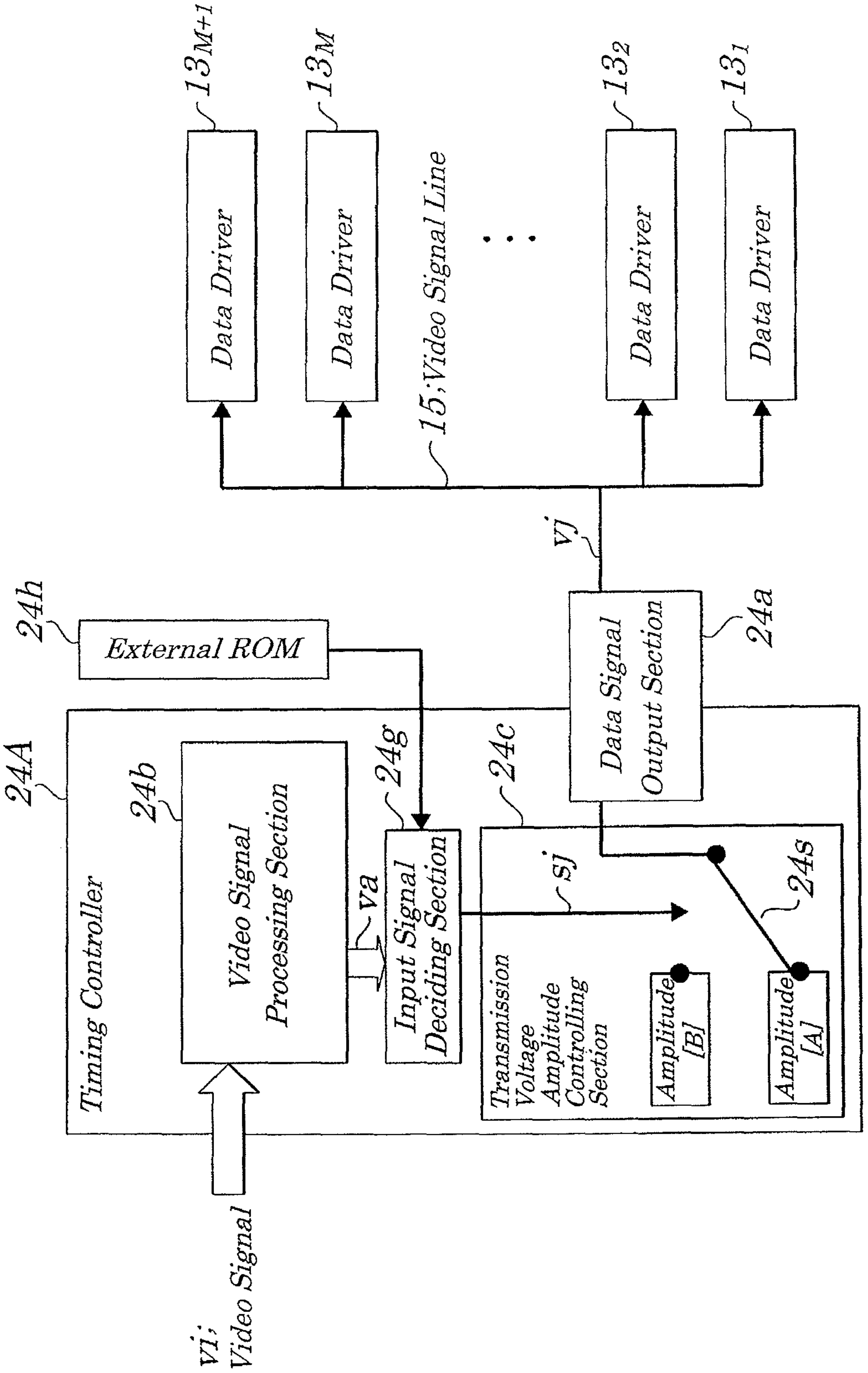
FIG. 4 is a block diagram for showing an electric configuration of important components of an image display device according to a second exemplary embodiment of the present invention.

FIG. 4 is a block diagram for showing the electric configuration of important components of an image display device according to the second exemplary embodiment of the present invention.

As shown in FIG. 4, in the image display device of the present exemplary embodiment, the timing controller 24 in FIG. 1 is replaced with a timing controller 24A having a different configuration. In the timing controller 24A, the input signal deciding section 24*d* in FIG. 1 is replaced with an input signal deciding section 24*g* having different functions. To the input signal deciding section 24*g*, an external ROM24*h* is connected which can be attached to and detached from the input signal deciding section 24*g*. The external ROM24*h* stores beforehand a decision condition in accordance with which the degree of an influence from wiring crosstalk between a pair of mutually neighboring signal lines (two neighboring signal line pairs) out of a video signal lines 15, 15, . . . is decided on the basis of an input signal va at, for example, each predetermined timing.

That is, in some cases, a target signal line (that is, the DATA (+) signal line in the first pair in FIG. 11) out of the video signal lines 15, 15, . . . may be influenced not only by the neighboring signal line (the DATA (−) signal line in the second pair) but also by a farther neighboring signal line, for example, the DATA (+) signal line in the second pair being adjacent to the DATA (−) signal line. Further, the signal line of interest may be influenced also by the signal line in the farther neighboring third or fourth pair and further, if a printed circuit board for transmitting a data signal vj includes a plurality of layers, by the neighboring layer (for example, the second layer neighboring the first layer of the printed circuit board). That is, wiring crosstalk may occur due to an influence not only from the signal line which neighbors and is in the vicinity of any other one of those of the video signal line 15 but also from the signal line that further neighbors that neighboring signal line as well as from the signal line in the upper or lower layer. In such a manner, the degree of the influence from wiring crosstalk may change with wiring layout conditions (disposing order, pattern spacing, and an inter-layer distance of the signal lines) of the video signal line 15. Accordingly, by storing beforehand the decision conditions corresponding to the varying degree of the influence from the wiring crosstalk in the external ROM24*h*, even if the influence degree of the wiring crosstalk changes, the corresponding decision conditions stored in the substituted external ROM24*h* will accommodate the change, thereby setting the voltage amplitude of the data signal vj to a necessary value corresponding to the influence degree of the wiring crosstalk.

The present image display device includes the external ROM24*h* and capable of externally changing decision conditions in response to the degree of an influence from wiring crosstalk, so that a decision reference value in the input signal deciding section 24$g$ can be changed easily corresponding to a wiring layout of the video signal lines on the printed circuit board.

Third Exemplary Embodiment

Figure 5:
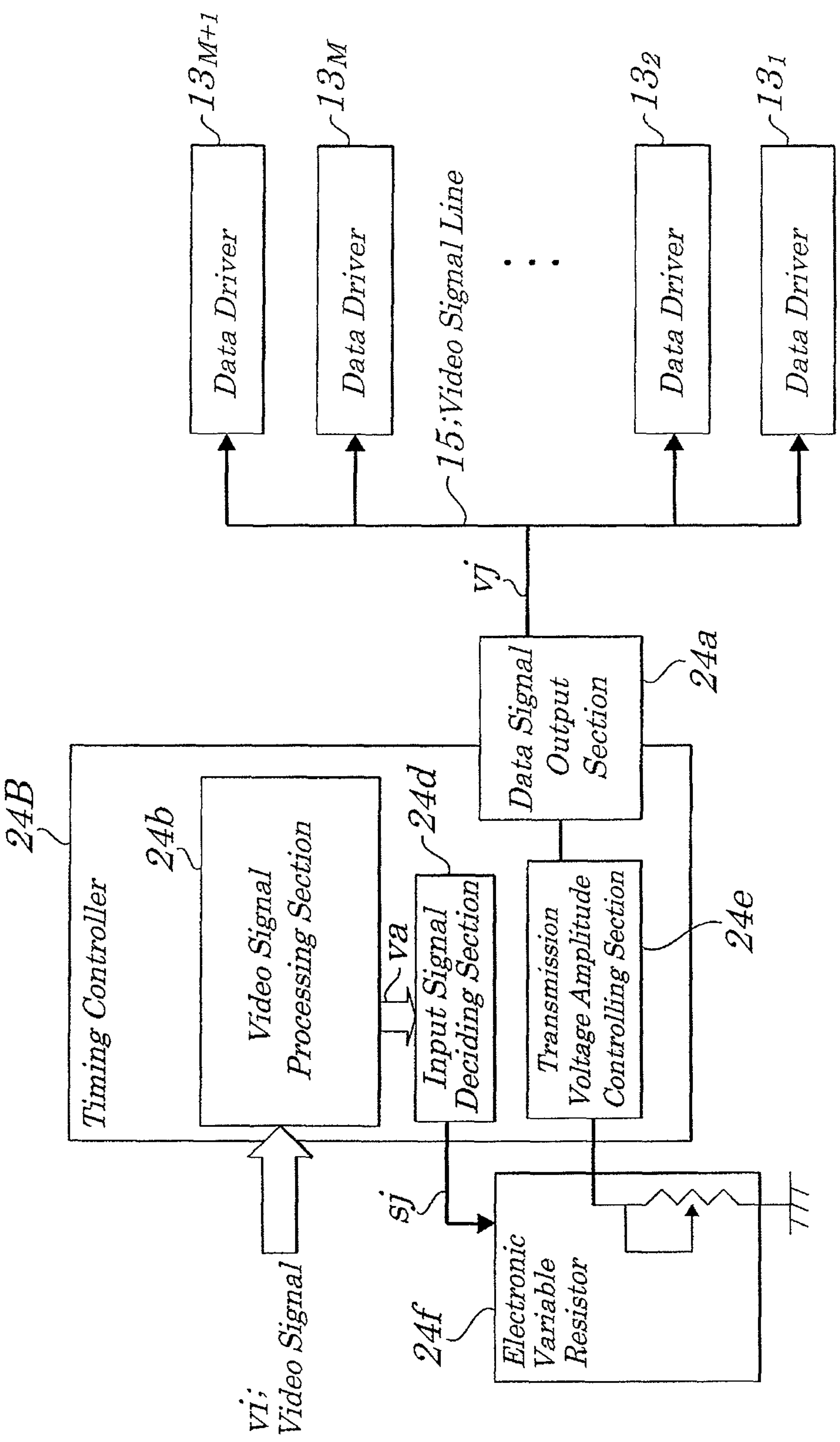
FIG. 5 is a block diagram for showing an electric configuration of important components of an image display device according to a third exemplary embodiment of the present invention.

FIG. 5 is a block diagram for showing the electric configuration of important components of an image display device according to the third exemplary embodiment of the present invention.

As shown in FIG. 5, in the image display device of the present exemplary embodiment, the timing controller 24 in FIG. 1 is replaced with a timing controller 24B having a different configuration. In the timing controller 24B, the transmission voltage amplitude controlling section 24$c$ in FIG. 1 is replaced with a transmission voltage amplitude controlling section 24$e$ having a different configuration. To the transmission voltage amplitude controlling section 24$e$, an electronic variable resistor (electronic volume control) 24$f$ is connected. The electronic variable resistor 24$f$ has its resistance value varied on the basis of a decision result sj from an input signal deciding section 24$d$. Based on the resistance value of the electronic variable resistor 24$f$, the transmission voltage amplitude controlling section 24$e$ continually controls the output voltage amplitude of a data signal vj. For the other components, see FIG. 1.

A description will be given below of a relationship between the electronic variable resistor 24$f$ and the output voltage amplitude of the data signal vj.

In an image display device in FIG. 12, a timing controller 14 includes a resistor 14$d$, to set an output voltage amplitude. By changing the resistance value of the resistor 14$d$, the output voltage amplitude will change. Ordinarily, once a resistance value of the resistor 14$d$ is determined, the output voltage amplitude is fixed corresponding to the resistance value; however, if an electronic variable resistor is used, by providing the electronic variable resistor with the decision result sj, the resistance value can be changed on a case-by-case basis. By utilizing this, the degree of an influence from wiring crosstalk, for example, is decided in the input signal deciding section 24$d$, the decision result sj from which is then transmitted to the electronic variable resistor 24$f$ so that a resistance value may be determined, thereby outputting an output voltage amplitude corresponding to the resistance value. The decision result sj may come in "1" in the case of a large degree of the influence from wiring crosstalk or "0" in the case of a small degree of the influence; further, by increasing the number of the bits of an input signal va, finer values can be obtained correspondingly.

In the present image display device, based on the decision result sj from the input signal deciding section 24$d$, the resistance value of the electronic variable resistor 24$f$ is varied, based on which resistance value, subsequently the output voltage amplitude of a data signal vj is controlled continually in the transmission voltage amplitude controlling section 24$e$ (transmission voltage amplitude control processing).

Accordingly, whatever video signal vi is input, control is conducted so that the output voltage amplitude of the data signal vj may agree with a reference voltage amplitude; therefore, it is possible to reduce all of display noise due to wiring crosstalk, EMI, and dissipation power as in the case of the first exemplary embodiment.

Fourth Exemplary Embodiment

Figure 6:
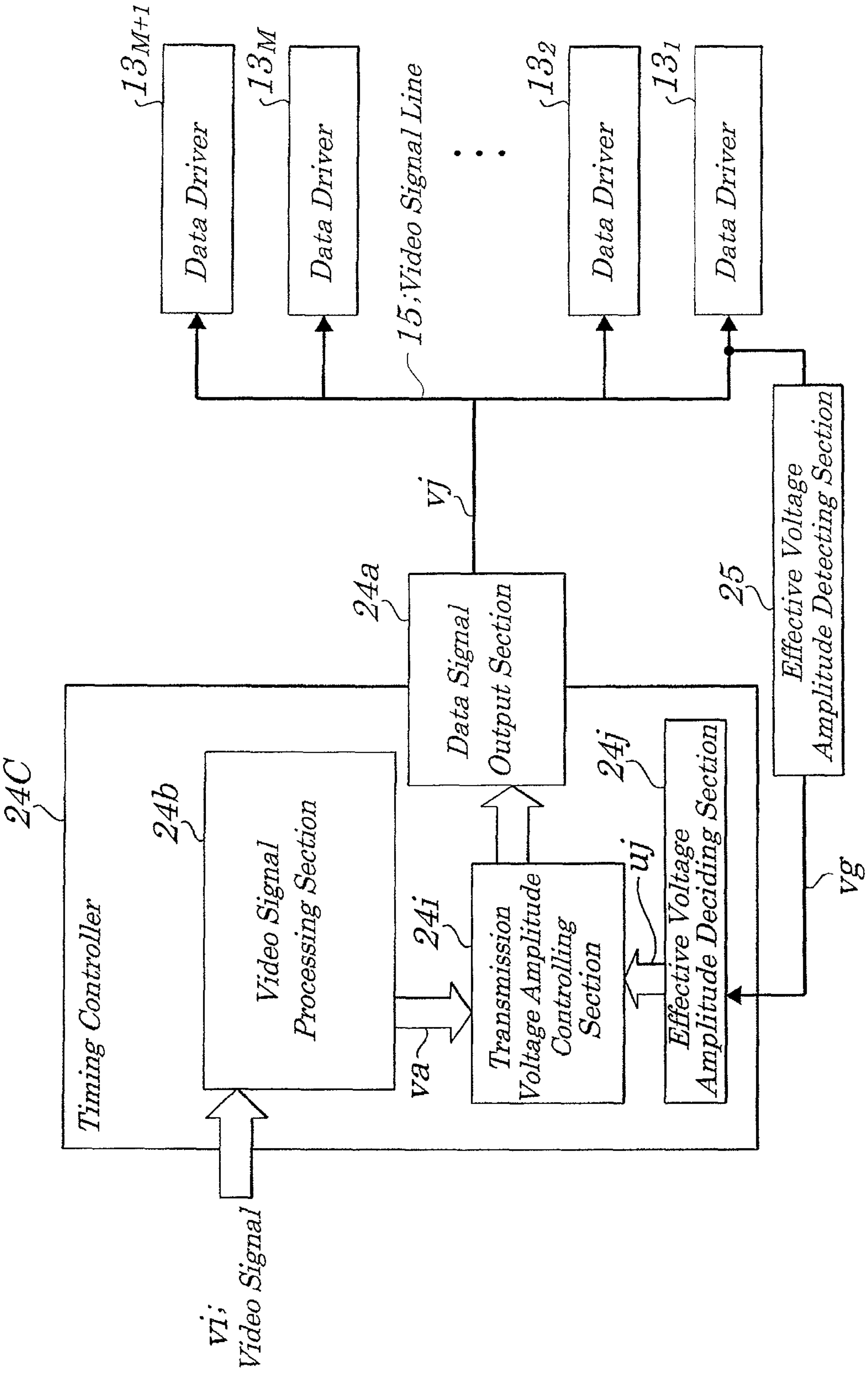
FIG. 6 is a block diagram for showing an electric configuration of important components of an image display device according to a fourth exemplary embodiment of the present invention.

FIG. 6 is a block diagram for showing the electric configuration of important components of an image display device according to the fourth exemplary embodiment of the present invention.

As shown in FIG. 6, in the image display device of the present exemplary embodiment, the timing controller 24 in FIG. 1 is replaced with a timing controller 24C having a different configuration, besides which an effective voltage amplitude detecting section 25 is newly provided. In the timing controller 24C, the input signal deciding section 24$d$ in FIG. 1 is deleted and the transmission voltage amplitude controlling section 24$c$ is replaced with a transmission voltage amplitude controlling section 24$i$ provided with different functions, besides which an effective voltage amplitude deciding section 24$j$ is provided. The effective voltage amplitude detecting section 25 is made of an analog/digital (A/D) converter and, particularly in the present exemplary embodiment, disposed in the vicinity of data drivers $\mathbf{13}_1$, $\mathbf{13}_2$, . . . , $\mathbf{13}_M$, and $\mathbf{13}_{M+1}$. The effective voltage amplitude detecting section 25 detects, as an effective voltage amplitude, a voltage amplitude of a data signal vi on a video signal line 15 in an immediately vicinity of the data drivers $\mathbf{13}_1$, $\mathbf{13}_2$, . . . , $\mathbf{13}_M$, and $\mathbf{13}_{M+1}$ and converts a value of the effective voltage amplitude into a digital value and then outputs it as a digital effective voltage amplitude value vg.

The effective voltage amplitude deciding section 24$j$ decides whether the effective voltage amplitude value vg output from the effective voltage amplitude detecting section 25 is larger or smaller than an input amplitude specification value for the data drivers $\mathbf{13}_1$, $\mathbf{13}_2$, . . . , $\mathbf{13}_M$, and $\mathbf{13}_{M+1}$ at, for example, each predetermined timing and outputs its decision result uj Based on the decision result uj from the effective voltage amplitude deciding section 24$j$, the transmission voltage amplitude controlling section 24$i$ conducts control so that the voltage amplitude (effective voltage amplitude) of the data signal vj may exceed the input amplitude specification value for the data drivers $\mathbf{13}_1$, $\mathbf{13}_2$, . . . , $\mathbf{13}_M$, and $\mathbf{13}_{M+1}$ by a predetermined value. The data signal vj having the voltage amplitude controlled by the transmission voltage amplitude controlling section 241 is sent by the data signal output section 24$a$ to the data drivers $\mathbf{13}_1$, $\mathbf{13}_2$, . . . , $\mathbf{13}_M$, and $\mathbf{13}_{M+1}$ via a video signal line 15. For the other components, see FIG. 1.

In the present image display device, the voltage amplitude of the data signal vj transmitted through the video signal line 15 is detected as an effective voltage amplitude by the effective voltage amplitude detecting section 25 in the immediately vicinity of the data drivers $\mathbf{13}_1$, $\mathbf{13}_2$, . . . , $\mathbf{13}_M$, and $\mathbf{13}_{M+1}$ and the value of the effective voltage amplitude is converted into a digital value and then output as the digital effective voltage amplitude value vg. The effective voltage amplitude value vg is decided by the effective voltage amplitude deciding section 24$j$ on whether it is larger or smaller than an input amplitude specification value for the data drivers $\mathbf{13}_1$, $\mathbf{13}_2$, . . . , $\mathbf{13}_M$, and $\mathbf{13}_{M+1}$ and then the decision result uj is output (effective voltage amplitude decision processing). The path along which the effective voltage amplitude value vg is transmitted is disposed to a place free of an influence by wiring crosstalk from the video signal line 15. This avoids the influence by wiring crosstalk from the video signal line 15 between the effective voltage amplitude detecting section 25 and the effective voltage amplitude deciding section 24$j$, thereby preventing erroneous decision from being made by the effective voltage amplitude deciding section 24$j$. The transmission voltage amplitude controlling section 24$i$ conducts control so that based on the decision result uj from the effective voltage amplitude deciding section 24$j$, the voltage amplitude (effective voltage amplitude) of the data signal vj may exceed the input amplitude specification value by the predetermined value (transmission voltage amplitude control processing) The data signal vj having the voltage amplitude controlled by the transmission voltage amplitude controlling section 24*i* is sent by the data signal output section 24*a* to the data drivers $\mathbf{13}_1$, $\mathbf{13}_2$, . . . , $\mathbf{13}_M$, and $\mathbf{13}_{M+1}$ via the video signal line 15 (data signal output processing).

As described hereinbefore, in the present fourth exemplary embodiment having the configuration different from that in the first exemplary embodiment, it is possible to reduce all of display noise due to wiring crosstalk, EMI, and dissipation power.

While the invention has beenparticularly shown and described with reference to exemplary embodiments thereof, the invention is not limited to these exemplary embodiments.

For example, the data signal vj transmitted to the video signal line 15 is not limited to a signal of eight-bit gradation data. Further, the input signal deciding section 24*d* in FIG. 5 showing the third exemplary embodiment may be replaced with the input signal deciding section 24*g* in FIG. 4 showing the second exemplary embodiment so that the external ROM24*h* might be connected thereto. Further, the number of the effective voltage amplitude detection sections 25 disposed in the vicinity of the data drivers $\mathbf{13}_1$, $\mathbf{13}_2$, . . . , $\mathbf{13}_M$, and $\mathbf{13}_{M+1}$ is not limited to one but it may be provided for each of the drivers to detect each effective voltage amplitude value vg, thereby controlling each output voltage amplitude. In this case, by controlling the output voltage amplitude by using a minimum value of the detected effective voltage amplitudes as a standard, display noise can be avoided.

Although the input signal deciding section 24*d* in FIGS. 1 and 5 and the input signal deciding section 24*g* in FIG. 4 have decided the degree of an influence from wiring crosstalk at each frame period, they may be configured to decide that degree, for example, at each horizontal period or in units of N number of clock pulses (N: one or larger natural number).

Further, although the effective voltage amplitude deciding section 24*j* in FIG. 6 have decided whether the effective voltage amplitude value vg output from the effective voltage amplitude detecting section 25 is larger or smaller than an input amplitude specification value for the data drivers $\mathbf{13}_1$, $\mathbf{13}_2$, . . . , $\mathbf{13}_M$, and $\mathbf{13}_{M+1}$ at each frame period, it may be configured to decide that value, for example, at each horizontal period or in units of N number of clock pulses (N: one or larger natural number).

Probability of Utilized Industrialization

The present invention is not limited to an LCD but can be applied to almost all image display devices such as a plasma display device that have such a configuration that a data signal corresponding to an incoming video signal may be transmitted via a video signal line (data signal transmission line) to a data driver by utilizing the differential transmission system.

What is claimed is:

1. An image display device comprising:

a display panel including a plurality of columns of data lines and a plurality of rows of scanning lines;

a data signal transmission line to transmit a data signal as a binary signal having a "H" or "L" level therethrough by a differential transmission system, the data signal transmission line which is defined as being a video signal line and connects a data signal output section to a data driver;

a display controlling unit to generate said data signal based on an input video signal and output the generated data signal via said data signal transmission line; and said data driver to write pixel data to each of said data lines in said display panel based on said data signal supplied from said display controlling unit via said data signal transmission line, wherein in said data driver, an input amplitude specification value is set to define a minimum reference voltage amplitude of said data signal for said data driver to operate properly;

wherein said data signal transmission line has a plurality of signal lines to transmit at least an arbitrary gradation level of said video signal, said plurality of signal lines divided into every two neighboring signal lines which transmit as a signal line pair mutually reverse-phase data signals for complying with said differential transmission system; and wherein said display controlling unit includes:

an input signal deciding section that decides a degree of an influence exerted upon said data signal by wiring crosstalk between two neighboring signal line pairs based on the generated data signal at each of predetermined timings;

a transmission voltage amplitude controlling section that controls a voltage amplitude of data signal so as to exceed said input amplitude specification value by a predetermined value, based on a result of the decision by said input signal deciding section; and said data signal output section that sends said data signal having the voltage amplitude controlled by said transmission voltage amplitude controlling section, to said data driver via said data signal transmission line.

2. The image display device according to claim 1, wherein when a first signal line making up a first signal line pair out of said two neighboring signal line pairs and a second signal line making up a second signal line pair out of said two neighboring signal line pairs are adjacent to each other, and a first data signal transmitted through said first signal line and a second data signal transmitted through said second signal line are in different states in logical level, said display controlling unit is configured to adjust the voltage amplitude of said first and second data signals to be greater than that of said first and second data signals at a time when said first data signal and said second data signal are in same states in logical level.

3. The image display device according to claim 1, wherein said input signal deciding section stores beforehand a decision condition in accordance with which the degree of the influence exerted upon said data signal by the wiring crosstalk between said two neighboring signal line pairs is decided on the basis of said data signal at each of the predetermined timings; and wherein in said transmission voltage amplitude controlling section, a plurality of preset voltage amplitude values for controlling is held to control the voltage amplitude of said data signal; and wherein said transmission voltage amplitude controlling section comprises a voltage amplitude value selecting unit to select and set the voltage amplitude of said data signal out of said plurality of preset voltage amplitude values for controlling based on the result of the decision by said input signal deciding section.

4. The image display device according to claim 3, wherein said input signal deciding section has storage unit configured to store said decision condition, said storage unit being arranged to be attachable to and detachable from said input signal deciding section.

5. The image display device according to claim 1, wherein said transmission voltage amplitude controlling section has voltage amplitude value varying unit configured to continually control the voltage amplitude of said data signal based on the result of the decision by said input signal deciding section.

6. An image display device comprising:

a display panel, including a plurality of columns of data lines and a plurality of rows of scanning lines;

a data signal transmission line to transmit a data signal as a binary signal having a "H" or "L" level therethrough by a differential transmission system, the data signal transmission line which is defined as being a video signal line and connects a data signal output section to a data driver;

a display controlling unit to generate said data signal based on an input video signal and output the generated data signal via said data signal transmission line;

said data driver to write pixel data to each of the said data lines in said display panel based on said data signal supplied from said display controlling unit via said data signal transmission line; and an effective voltage amplitude detecting unit that detects, as an effective voltage amplitude, a voltage amplitude of said data signal on said data signal transmission line in an immediately vicinity of said data driver and then outputs a value of said effective voltage amplitude, wherein in said data driver, an input amplitude specification value is set to define a minimum reference voltage amplitude of said data signal for said data driver to operate properly;

wherein said data signal transmission line has a plurality of signal lines to transmit at least an arbitrary gradation level of said video signal, said plurality of signal lines divided into every two neighboring signal lines which transmit as a signal line pair mutually reverse-phase data signals for complying with said differential transmission system; and wherein said display controlling unit comprises:

an effective voltage amplitude deciding section that decides whether said value of effective voltage amplitude is larger or smaller than said input amplitude specification value at each of a predetermined timings, in order to decide a degree of an influence exerted upon said data signal by wiring crosstalk between two neighboring signal line pairs;

a transmission voltage amplitude controlling section that controls the voltage amplitude of said data signal so as to exceed said input amplitude specification value by a predetermined value based on the result of the decision by said effective voltage amplitude deciding section; and a data signal output section that sends said data signal whose voltage amplitude has been controlled by said transmission voltage amplitude controlling unit to said data driver via said data signal transmission line.

7. The image display device according to claim 6, wherein said effective voltage amplitude detecting unit is disposed in the vicinity of said data driver, to detect said effective voltage amplitude and perform analog/digital conversion on its value and then output a digital value of said effective voltage amplitude.

8. The image display device according to claim 1, wherein said degree of the influence exerted upon said data signal by the wiring crosstalk is a degree of attenuation of the voltage amplitude of said data signal transmitted through said data signal transmission line.

9. A video signal processing method which is used in an image display device comprising a display panel including a plurality of columns of data lines and a plurality of rows of scanning lines; a data signal transmission line to transmit a data signal as a binary signal having a "H" or "L" level therethrough a differential transmission system, the data signal transmission line which is defined a being a video signal line and connects a data signal output section to a data driver; a display controlling unit to generate said data signal based on an input video signal and output the generated data signal via said data signal transmission line; and said data driver to write pixel data to each of said data lines in said display panel based on said data signal supplied from said display controlling unit via said data signal transmission line, said display controlling unit comprises a voltage amplitude adjusting unit, the method comprising:

setting an input amplitude specification value in said data driver, to define a minimum reference voltage amplitude of said data signal for said data driver to operate properly; and said voltage amplitude adjusting unit performing a voltage amplitude adjustment processing of deciding a degree of an influence exerted upon said data wherein said display controlling unit performs:

an input signal decision processing of deciding a degree of an influence exerted upon said data signal by wiring crosstalk between two neighboring signal line pairs based on the generated data signal at each of predetermined timings;

a transmission voltage amplitude control processing of controlling a voltage amplitude of data signal so as to exceed said input amplitude specification value by a predetermined value, based on a result of the decision by said input signal decision processing; and a data signal output processing of sending said data signal having the voltage amplitude controlled by said transmission voltage amplitude control processing, from said data signal output section to said data driver via said data signal transmission line.

10. A video signal processing method which is used in an image display device comprising a display panel including a plurality of columns of data lines and a plurality of rows of scanning lines; a data signal transmission line to transmit a data signal as a binary signal having a "H" or "L" level therethrough by a differential transmission system, the data signal transmission line which is defined as being a video signal line and connects a data signal output section to a data driver; a display controlling unit to generate said data signal based on an input video signal and output the generated data signal via said data signal transmission line; and said data signal driver to write pixel data to each of said data lines in said display panel based on said data signal supplied from said display controlling unit via said data transmission line, an effective voltage amplitude detecting unit that detects, as an effective voltage amplitude, a voltage amplitude of said data signal on said data signal transmission line in an immediately vicinity of said data driver and then outputs a value of said effective voltage amplitude, wherein in said data driver, an input amplitude specification value is set to define a minimum reference voltage amplitude of said data signal for said data driver to operate properly; and wherein said data signal transmission line has a plurality of signal lines to transmit at least arbitrary gradation level of said video signal, said plurality of signal lines divided into every two neighboring signal lines which transmit as a signal line pair mutually reverse-phase data signals for complying with said differential transmission system, wherein said display controlling unit performs:

an effective voltage amplitude decision processing of deciding of deciding whether said value of effective voltage amplitude is larger or smaller than said input amplitude specification value at each of a predetermined timings, in order to decide a degree of an influence exerted upon said data signal by wiring crosstalk between two neighboring signal line pairs;

a transmission voltage amplitude control processing of controlling the voltage amplitude of said data signal so as to exceed said input amplitude specification value by a predetermined value based on the result of the decision by said effective voltage amplitude decision processing; and a data signal output processing of sending said data signal whose voltage amplitude has been controlled by said transmission voltage amplitude control processing from said data signal output section to said data driver via said data signal transmission line.

11. The video signal processing method according to claim 9, wherein said degree of the influence exerted upon said data signal by the wiring crosstalk is a degree of attenuation of the voltage amplitude of said data signal transmitted through said data signal transmission line.

* * * * *